United States Patent
Baxley et al.

(10) Patent No.: US 12,066,564 B2
(45) Date of Patent: Aug. 20, 2024

(54) SYSTEMS AND METHODS FOR DETECTING MICROWAVE PULSES

(71) Applicant: Bastille Networks, Inc., Atlanta, GA (US)

(72) Inventors: Bob Baxley, Atlanta, GA (US); Roy Thompson, Atlanta, GA (US)

(73) Assignee: Bastille Networks, Inc., Atlanta, GA (US)

(*) Notice: Subject to any disclaimer, the term of this patent is extended or adjusted under 35 U.S.C. 154(b) by 283 days.

(21) Appl. No.: 17/453,317

(22) Filed: Nov. 2, 2021

(65) Prior Publication Data

US 2023/0132787 A1    May 4, 2023

(51) Int. Cl.
*G01S 7/295* (2006.01)
*G01S 7/292* (2006.01)
*G01S 13/89* (2006.01)

(52) U.S. Cl.
CPC .......... *G01S 7/295* (2013.01); *G01S 7/292* (2013.01); *G01S 13/89* (2013.01)

(58) Field of Classification Search
None
See application file for complete search history.

(56) References Cited

U.S. PATENT DOCUMENTS

| 5,578,988 | A * | 11/1996 | Hoseit ............. G08B 13/2494 340/552 |
| 9,978,469 | B1 | 5/2018 | Vencelj et al. |
| 2002/0167445 | A1 | 11/2002 | Eden |
| 2006/0049985 | A1 | 3/2006 | Riel et al. |
| 2014/0080434 | A1 | 3/2014 | Louzir et al. |
| 2016/0156769 | A1* | 6/2016 | Row ................. H04W 24/10 455/404.1 |

FOREIGN PATENT DOCUMENTS

JP    2018059932 A    4/2018

OTHER PUBLICATIONS

International Search Report & Written Opinion of the International Searching Authority mailed Dec. 20, 2023.

* cited by examiner

Primary Examiner — Whitney Moore
(74) Attorney, Agent, or Firm — Eversheds Sutherland (US) LLP

(57) ABSTRACT

Described herein are systems and methods for detecting microwave pulses. An example method may include identifying, by a first sensor, a first signal in an environment, the first signal including a signal in a microwave frequency range. The example method may also include determining first data associated with the first signal, the first data being associated with one or more parameters. The example method may also include determining that the first data exceeds a threshold. The example method may also include sending, based on the determination that the first data exceeds a threshold, an alert.

17 Claims, 9 Drawing Sheets

SYSTEMS AND METHODS FOR DETECTING MICROWAVE PULSES

BACKGROUND

In 2016, an individual in the US Embassy in Havana, Cuba, experienced acute severe pain and a sensation of intense pressure in the face, a loud piercing sound in one ear with directional features, and acute disequilibrium and nausea. Multiple similar cases of acute physiological response occurred for other Embassy personnel in Cuba. These cases first came to the public's attention in 2017, but the cause remained unknown. In some cases, these symptoms are a result of a direct energy pulsed microwave radio frequency (RF) attack.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements, which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
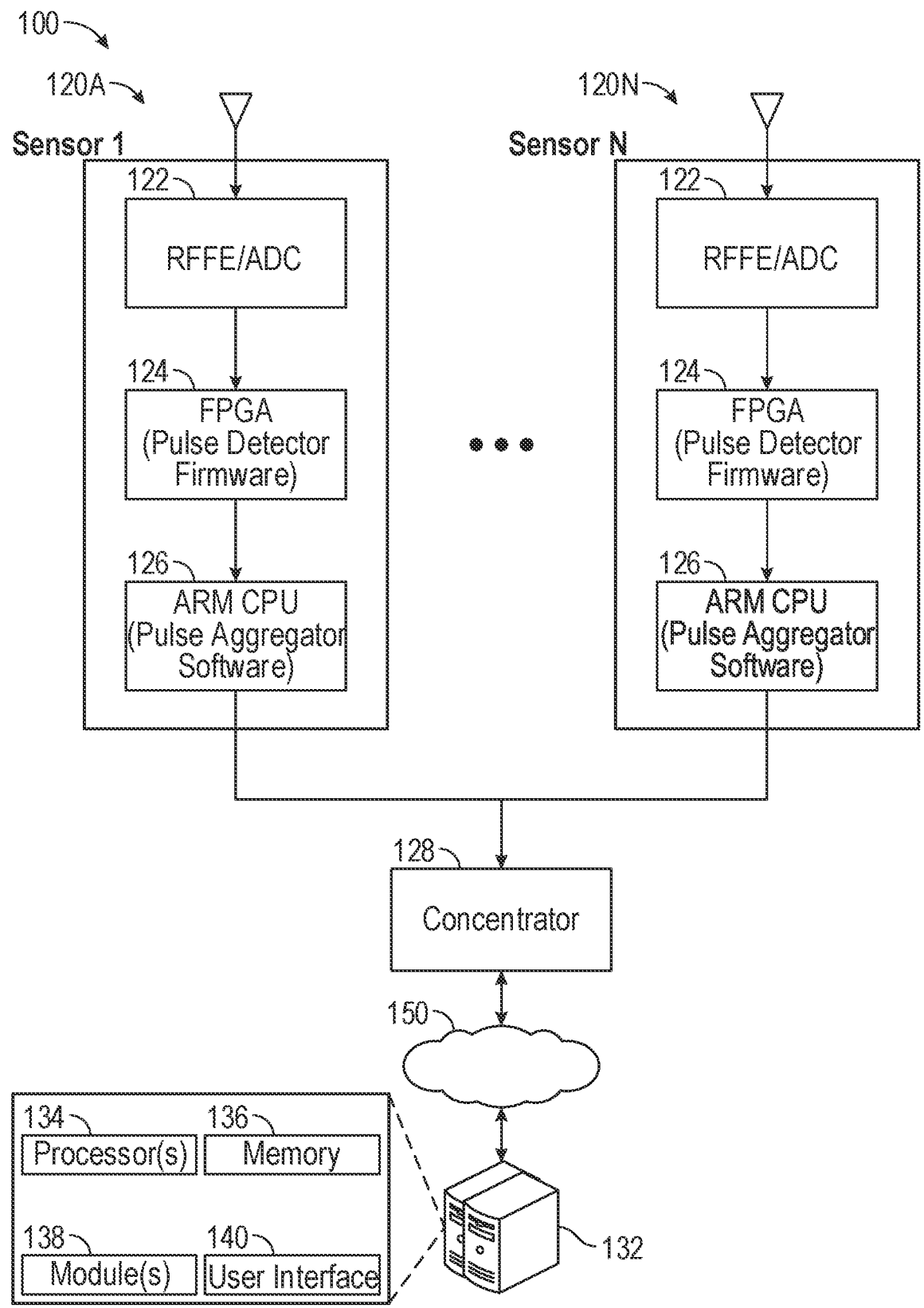
FIG. 1 illustrates an example system, in accordance with one or more embodiments of the disclosure.

This disclosure relates to, among other things, systems and methods for detecting microwave pulses. Particularly, the systems and methods described herein may relate to detecting short microwave pulses that may be characteristic of intentional attacks (for example, attacks directed towards humans) from RF microwave pulse emitters. Certain aspects of the systems and methods may also involve alerting a user when such microwave pulses are detected, as well as providing information to the user, such as a source of the microwave pulses and/or characteristics of the microwave pulses themselves.

In some embodiments, these microwave pulses may be identified by one or more sensors that together may form a sensor array. The one or more sensors may be dispersed within a given environment and may constantly or periodically monitor signal transmissions within the environment. In some embodiments, the sensors may be software-defined radio (SDR) sensors. The sensors may include at least multiple scanning 802.11 Wi-Fi receivers, multiple SDR receivers front ends that can provide(?) each sample at 61.44 MSps and sense from 25 MHz to 6 GHz, and/or an array of bespoke internal antennas that may be optimized to maximize detection and localization performance. The sensors may also include directional antennas that may be used to more effectively detect the microwave signals. For instance, the directional antennas may be fixed to point outside of a fence-line or over a border. This may aid in the identification of whether an RF emissions is coming from the exterior of a perimeter vs the interior of a perimeter. However, this is just one non-limiting example of a specific type of sensor that may be deployed, and the sensors may be configured with any other types of hardware and signal detection and/or processing capabilities as well.

Additionally, in some embodiments, the sensors of the sensor array may be configured based on particular operational parameters. These parameters may be employed by the sensors, for example, in order to determine when a received signal is a signal of interest (for example, a signal characteristic of a short pulse microwave signal), and when data associated with the signal should be packaged and provided to a computing system for processing. That is, not every signal received by a given sensor may be a short pulse microwave signal. It may be desirable to mitigate the amount of irrelevant data that is processed to reduce the processing load on the system, and to allow the system to focus resources on signals of interest. These parameters may be user-defined parameters and/or may be automatically determined based on artificial intelligence, machine learning, and/or the like. Examples of such parameters may include at least frequency, bandwidth, pulse duration, pulse repetition rate, on-target peak power density, standoff distance, minimum pulse width, maximum pulse width, amplitude threshold, search frequency list, and/or dwell time per tune frequency, as well as any other parameters. In some cases, frequency may refer to a frequency of a signal that is received, and bandwidth may refer to instantaneous bandwidth of the signal that is received. The pulse duration may refer to a length of pulse in time measured in seconds, for example. The pulse repetition rate may refer to how often a pulse is transmitted every second, which is measured in Hz. The on-target peak power density may refer to a maximum received power density measured in $W/m^2$. The standoff distance may refer to a distance between the transmitter and the target. The amplitude threshold may refer to a threshold magnitude of the received signal. The search frequency list may refer to a range of frequencies that the sensors scan (for example, a range of frequencies that the sensors may monitor for the pulses). The dwell time may refer to a length of time that a particular sensor may monitor a given frequency or set of frequencies before moving on to monitor another frequency or given set of frequencies. It should be noted that any units of measurement mentioned above (or otherwise herein) may simply be exemplary, and any unit of measurement may similarly be used.

Particularly, in some cases, the following values may be used for some of the parameters mentioned above. A frequency between 25 MHz and 6 GHz. A bandwidth between 0-61.44 MHz. A pulse duration less than 16 ns or between 16 ns and 1 s. A pulse repetition rate between 0.1 Hz and 2000 Hz. A received power between 0 and 2.5 dBm. If a received signal were to include properties that satisfy the aforementioned parameters, then the signal may be indicative of an intentional short pulse microwave attack. Otherwise, the signal may be disregarded. However, this is just an example of parameter values that may be employed, and is not intended to be limiting in any way.

As mentioned, some or all of these signal-monitoring parameters may be fixed or may be manually or automatically adjusted. For example, the system may include a user interface that an operator may interact with. The operator may be able to select and adjust different parameters through the user interface. For example, the operator may be able to set a minimum and maximum pulse width, list of frequencies to scan, etc. The operator may also be able to add and/or remove parameters from the list of parameters that are considered by the system. Alternatively, or in combination with manual selection, the system may also automatically perform adjustments to the types of parameters that are selected. For example, the system may include artificial intelligence, machine learning, and/or the like. Additionally, in scenarios where machine learning is employed, machine learning may be trained during real-time operation in order to more effectively identify which parameters may be more indicative of a short pulse microwave attack. As the system captures (through the sensors) and analyzes signal transmissions present in the environment in which the sensors are disposed, and determinations as to whether the signals are indicative of short pulse microwave attacks are made, the machine learning may use this information to adjust which parameters are monitored and/or to adjust weights applied to different parameters. For example, if it is determined that a certain pulse shape is consistently associated with the identification of a short pulse microwave attack, then that particular pulse shape may automatically provide greater weight than other pulse shapes.

The sensors included in the sensor array may also be capable of detecting signals other than microwave pulses as well. For example, as may be described in additional detail below, the microwave pulse detection capabilities of the sensors may be one of several modules associated with the sensor array. A first example module may involve the capability to demodulate known signals (WiFi, Bluetooth, Bluetooth Low Energy, Internet of Things, etc.). A second example module may include a spectrum scan. In the spectrum scan, the sensors may scan an entire frequency spectrum and may report information about detected transmissions. For example, the sensors may report power levels in different parts of the spectrum. As a third example module, the sensors may be configured to characterize pulse transmissions and report pulse characteristics. This example module may, in some cases, be applicable to the microwave pulse detection described herein because a module involving scanning an entire spectrum may not be as effective for detection of short microwave pulses.

In some cases, the system may only have one of the modules active within a given period of time. For example, only the microwave pulse detection module may be active at a first time, and during that first time, the additional modules may not be active. However, in some cases, all of the modules may be active at all times. For example, the system may capture data relating to different types of signals and may analyze all of this data. If a given module indicates that a particular type of signal may be indicative of a malicious attack, then more focus may be provided to that module. As with the parameters, the modules that are active may be manually and/or automatically adjusted. For example, the same user interface that allows the operator to adjust the parameters may also allow the operator to select which modules should be active. If the operator is only interested in monitoring for short pulse microwave attacks, then modules associated with BLE signals may be deactivated to place a greater emphasis on the short pulse microwave signals. Artificial intelligence, machine learning, and/or the like may also be able to determine when different modules should be active. For example, if it is determined that a short pulse microwave signal is detected by one sensor, the system may automatically disable other modules in order to focus on identifying the short pulse microwave signals. The system may also automatically adjust which modules are active based on other information, such as user preferences, for example.

Additionally, in some cases, not all of the sensors may be configured with the same parameters or with the same modules being active at the same time. As one non-limiting example, an office space may have three different rooms with three different sensors. A first sensor in one room may be specifically configured to detect short microwave pulses, whereas a second sensor may be configured to detect other types of signals. As another non-limiting example, all three of the sensors may initially be configured to detect all types of signals. Continuing this example, one sensor in one room may detect a short microwave pulse. Based on this, only the one sensor may be re-configured to specifically focus on detecting additional short microwave pulses, whereas the other two sensors may remain configured to detect all types of signals. These are merely exemplary scenarios, and any other type of sensor setups and/or adjustments may be applicable as well.

In some embodiments, once a signal is received by a sensor and is determined to satisfy any defined parameters configured for that sensor, the system may package some or all of the data associated with the signal into a single pulse descriptor message. The single pulse descriptor message, for example, may refer to a unit of data of a defined bit length. The single pulse descriptor message may include data relating to a single microwave pulse that is detected by the sensor array. The types of data included in the single pulse descriptor message may include, for example, a frequency, a timestamp, an amplitude, and/or a pulse width, as well as any other types of data. Similar to the parameters described above, this data included in the single pulse descriptor message may also be manually or automatically changed. Again, the same user interface that allows the operator to adjust the parameters may also allow the operator to select which information should be packaged into the single pulse descriptor message.

In some embodiments, data associated with single microwave pulses may be aggregated into an aggregated pulse descriptor message. The types of data included an aggregated pulse descriptor message may include, for example, a frequency, a timestamp of a first pulse, an average amplitude, an average pulse width, a pulse repetition interval, as well as any other types of data. Similar to the parameters and/or single pulse descriptor messages described above, this data included in the single pulse descriptor message may also be manually or automatically changed.

In some cases, a user interface may also be presented that may provide a user with a visual information based on the data that is obtained from the sensor array. For example, the user interface may present a visual illustration of an environment in which the various sensors are physically positioned. The user interface may present any information about any of the data collected from the sensors, such as data associated with specific pulses, the sensor(s) that identified the pulses, and/or any other types of information. The user interface may also be used to geo-locate an origin of a given signal. The location of the origin may be indicated on the visual depiction of the environment (for example, through an "x" placed on the visual depiction at the location of the origin, or any other type of indicator). Furthermore, the user interface may allow alerts to be presented to the operator. For example, the alerts may include an indication that a short pulse microwave attack has been detected. The user interface may then present a location of the source of the attack, as well as any other information that may be relevant. The alert may be a visual alert, auditory alert, a combination of the two, and/or any other type of alert. Alerts may also be presented in other scenarios as well, such as if a particular sensor is malfunctioning, to name one non-limiting example.

Turning to the figures, FIG. 1 illustrates an example system 100, in accordance with one or more embodiments of the disclosure. The system may include one or more sensors, such as sensors 120A . . . 120N (the sensors may be referred to herein as "sensors 120"). The one or more sensors 120 may be dispersed within a given environment and may constantly or periodically monitor signal transmissions within the environment. In some embodiments, the sensors 120 may be software-defined radio (SDR) sensors. The sensors 120 may include at least multiple scanning 802.11 Wi-Fi receivers, multiple SDR receivers front ends that can provide(?) each sample at 61.44 MSps and sense from 25 MHz to 6 GHz, and/or an array of bespoke internal antennas that may be optimized to maximize detection and localization performance. However, this is just one non-limiting example of a specific type of sensor that may be deployed, and the sensors 120 may be configured with any other types of hardware and signal detection capabilities as well.

In some embodiments, the sensors 120 may include at least an analog to digital converter 122, a field-programmable gate array (FPGA) 124, and/or a central processing unit (CPU) 126. The analog to digital converter 122 may be used to convert an analog signal received by the sensor 120 from an environment into a digital signal that may then be processed by the computing system(s) 132. The field-programmable gate array (FPGA) 124 may package some or all of the data into a single pulse descriptor message. The single pulse descriptor message, for example, may refer to a unit of data of a defined bit length. The single pulse descriptor message may include data relating to a single microwave pulse that is detected by the sensor array The types of data included in the single pulse descriptor message may include, for example, a frequency, a timestamp, an amplitude, and/or a pulse width, as well as any other types of data. Similar to the parameters described above, this data included in the single pulse descriptor message may also be manually or automatically changed. Again, the same user interface that allows the operator to adjust the parameters may also allow the operator to select which information should be packaged into the single pulse descriptor message. The ARM central processing unit 126 may aggregate into an aggregated pulse descriptor message. The types of data included in an aggregated pulse descriptor message may include, for example, a frequency, a timestamp of a first pulse, an average amplitude, an average pulse width, a pulse repetition interval, as well as any other types of data. Similar to the parameters and/or single pulse descriptor messages described above, this data included in the single pulse descriptor message may also be manually or automatically changed.

The system 100 may also include at least one concentrator 128. The concentrator 128 may serve to receive any single or aggregated pulse descriptor messages from the various sensors 120, and may provide them to a computing system 132 for processing. The computing system may either be located locally to the environment in which the sensors 120 are located, may be integrated into the sensors 120 themselves, or may be located remotely to the environment. Additionally, the system 100 may include more than one computing system, in some cases 132. The computing system may include at least one or more processor(s) 134, memory 136, module(s) 138, and/or a user interface 140. Additional details about some or all of the elements of the computing system 132 may be provided with respect to the machine 900 of FIG. 9.

Any of the information captured by the sensors 120 may be transmitted to the computing systems 132 (if the computing system(s) 132 are located externally to the sensors 120) over a communications network 150 using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). The communications network 150 may also be used to transmit information from the computing system(s) 132 to the sensors 120. For example, parameters established by an operator through the user interface 140 may be transmitted to the sensors 120 to adjust the filters of the sensors 120. The communications network 150 may also be used to transmit information between sensors 120 as well. Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. The communications network may be described in more detail with respect to the communications network 926 of FIG. 9.

It should be noted that while the system 100 is depicted as including the concentrator 128, the FPGA 124, and the CPU 126, some of these components may not be required. For example, the FPGA 124 and CPU 126 may be replacing by a single processing unit and/or the concentrator 128 may be removed from the system. That is, the system 100 configuration described above is merely exemplary, and is not intended to be limiting in any way.

Figure 2:
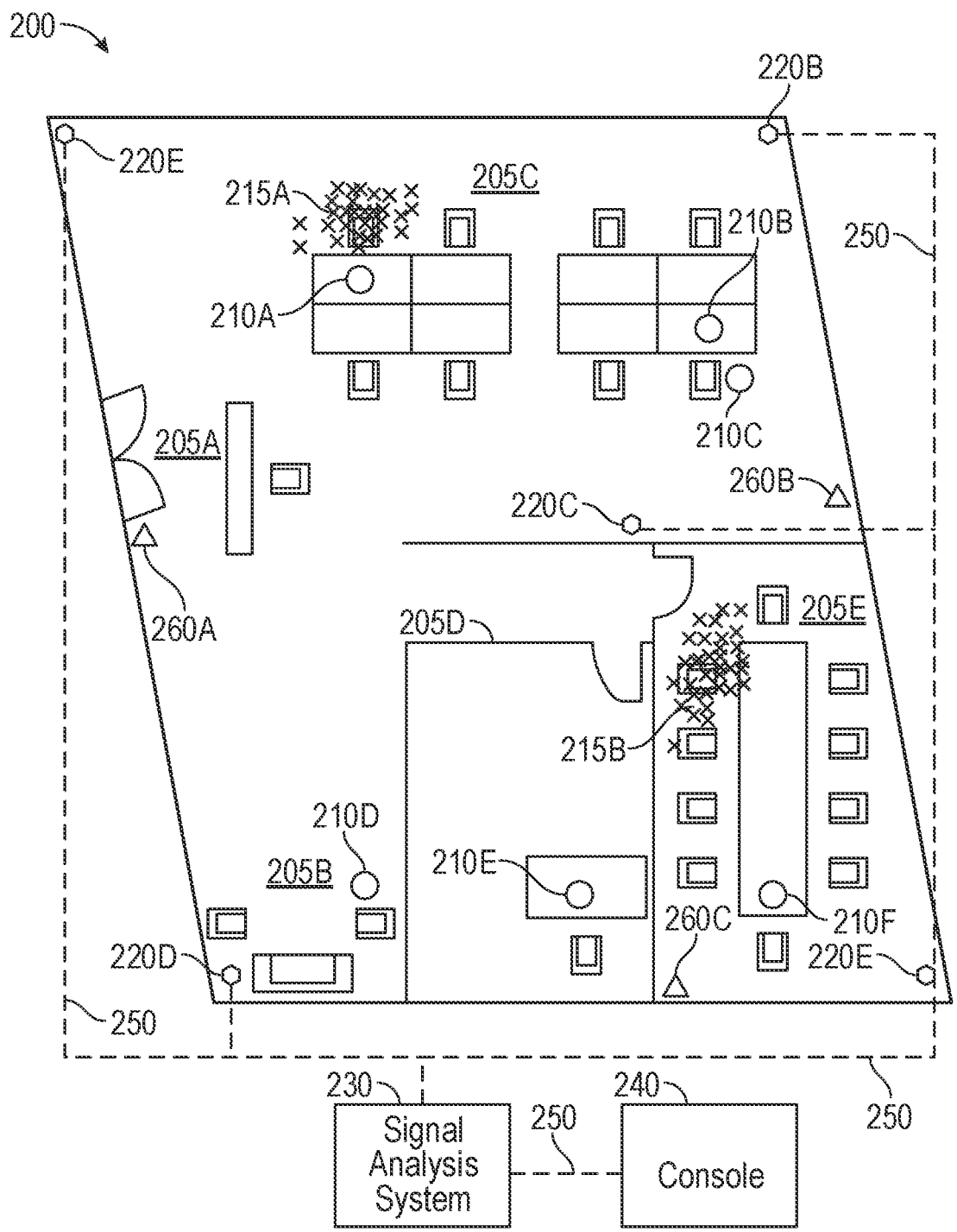
FIG. 2 illustrates an example system, in accordance with one or more embodiments of the disclosure.

FIG. 2 is a block diagram depicting an electromagnetic environment and signature analysis system 200 in accordance with one or more embodiments presented herein. That is, FIG. 2 may illustrate the implementation of the system 100 within a real-world environment. Wireless devices 210A-210F may each engage in one or more modes of radio communication, thereby generating electromagnetic signals. For example, the wireless devices 210A-210F may be capable of generating short microwave pulses. The wireless devices 210A-210F may also be capable of generating any other types of signals as well. The technology presented herein can collect and analyze these signals. Sensors 220A-220E positioned within collection areas 205A-205E can collect and report such signals (as well as any other information as described herein) within the surrounding electromagnetic environment. A signal analysis system 230 can process the collected radio frequency signals. Position estimates 215A-215B may be established, modeled, and tested to locate the wireless devices 210A-210F within the electromagnetic environment. Video cameras 260A-260C can provide video surveillance information associated with the electromagnetic environment. A console 240 can provide a user interface for configuring, controlling, or reviewing analysis results associated with the signal analysis system 330. As aforementioned, the user interface may also allow the user to configure parameters used by the sensors 220A-220E, may present alerts to a user, may provide an indication of a source of a short pulse microwave signal (or any other signal), and/or may provide any other types of functionality for a user. One or more networks 250 (which may be the same as network 150 described with respect to FIG. 1, and/or any other network described herein) may interconnect some or all of the sensors 220, the signal analysis system 230, and the console 240.

The collection areas 205A-205E may be referred to, in general, or collectively, as collection areas 205. Electromagnetic signals (for example, short microwave pulses, and/or any other types of signals) within the collection areas 205 may be sampled for processing and analysis as presented herein. Within the illustrated office environment, the collection area 205A is a reception area, the collection area 205B is a waiting area, the collection area 205C is an open working area, the collection area 205D is an office area, and the collection area 205E is a conference room area. However, it should be noted that these are merely examples of collection areas 205, and are not intended to be limiting in any way.

The wireless devices 210A-210F may be referred to, in general, or collectively, as wireless devices 210 or a wireless device 210. The wireless devices 210 may include smartphones, computers, wearable devices, embedded computing devices, building system devices, industrial control/automation systems, physical security systems, security monitoring devices, automotive systems, avionics, point of sales systems, customer localization systems, inventory systems, wireless data/voice/video infrastructure, access control systems, and so forth. The wireless devices 210 may use Wi-Fi, Bluetooth, Zigbee, mobile telephone, GSM, CDMA, satellite, LTE technology, or various other wireless communication technologies. Additionally, as aforementioned, the wireless devices 210 may also be capable of generating short microwave pulses as well.

The sensors 220A-220E may be referred to, in general, or collectively, as sensors 220 or a sensor 220. The sensors 220 may collect electromagnetic signals from one or more antennas over a wide bandwidth of radio frequencies. The sensors 220 may utilize hardware radio receivers or software-defined radio frequency receivers. According to various embodiments, these radio receivers can convert received radio frequency energy into digital signals. These digital signals can then be decoded into encoded data streams. The sensors 220 may be the same as sensors 120 and/or any other sensors described herein.

While hardware-defined radio receivers can be cost-effective and less complex to implement, they may be limited as to what type of encoded data streams they can detect from the electromagnetic environment. For example, a hardware Wi-Fi receiver module or chipset is generally not able to also receive mobile telephone radio signals. In contrast, software-defined radio receivers can much more flexibly receive and decode various data streams within the electromagnetic environment under software control. The signal data collected by the sensors 220 may be transmitted to the signal analysis system 230 for processing. These signals or related signal data may be communicated in a continuous fashion or in one or more batches, at particular intervals according to various embodiments.

The video cameras 260A-260C may be referred to, in general, or collectively, as video cameras 260. The video cameras 260 can provide video surveillance information associated with the electromagnetic environment. The video surveillance information may comprise various video streams. The video streams may be stored or logged to a recording device such as a digital video recorder (DVR) system. The video streams may be communicated using the same networks 250 as signals associated with the sensors 220. Alternatively, the video streams may be communicated using separate channels, coaxial cables, wireless channels, and so forth. The video streams may be available to the signal analysis system 230 for radio frequency and video coprocessing.

The signal analysis system 230 can receive and process signals from the sensors 220. The signal analysis system 230 may perform, among other functions, raw signal analysis, signal aggregation, multiple-input antenna processing, space-time-frequency analysis, geolocation, link pair association, throughput estimation, classification, attack analysis, and various other types of signal processing and analysis. The signal analysis system 230 may comprise a signal aggregation and analysis engine comprised of one or more feature vector processors.

The signal analysis system 230 may be comprised of multiple systems that perform different portions of analysis and pass signals between each other in various formats over various communication links of the networks 250. For example, the signal analysis system 330 may comprise a complex and flexible network of various processing devices, which may be distributed to certain degrees or layered in a hierarchical system, to analyze and process the signals from the sensors 220.

The position estimates 215A-215B may be referred to, in general, or collectively, as position estimates 215. The position estimates 215 may be established, modeled, and tested to locate the wireless devices 210 within the electromagnetic environment.

The console 240 and various associated operator interfaces can support configuring, controlling, or reviewing analysis results associated with the signal analysis system 230. The console 240 can provide visualization features for use by security administrators to monitor the electromagnetic environment for wireless security threats. Such visualizations may include displays about the area under surveillance, including device type, device position, pair-wise wireless communication links between devices, estimates of the data throughput being transmitted by devices, attack types being perpetrated, victim devices, and so forth. The operator interfaces may comprise interfaces associated with one or more visualization consoles 240, one or more administrative user interface applications, or various other user or system interfaces associated with the technology presented herein. The operator interfaces can present threat information associated with identified wireless attacks.

The networks 250 may interconnect some or all of the sensors 220, the signal analysis system 230, and the console 240. Portions of the networks 250 connecting the sensors may be configured to transmit radio frequency signals and/or digital information. Radio frequency signals may be communicated as collected, down-converted using an intermediate frequency oscillator, or down-converted to baseband. Communication links associated with the networks 250 may use various physical media such as twisted pair, coaxial cable, or fiber optic cables. The signals transferred on the physical media may be analog RF, radio over fiber, digital, packetized, switched, connection-oriented, or any combination thereof. According to various embodiments, the communication links associated with the networks 250 may use wireless frequencies or transmission paths that are selected to avoid interference from or to the electromagnetic environment in use by the wireless devices 210.

It should be appreciated that, according to certain embodiments, the wireless devices 210 may also make use of the networks 250. According to certain other embodiments, the wireless devices 210 may be dissuaded or precluded from sharing the networks 250 with the signal collection and analysis systems presented herein and instead may connect to one or more production networks that are separate from the networks 250 associated with the sensors 320 and/or the signal analysis system 230.

The sensors 220, or the antennas associated therewith, may be physically distributed around an area under surveillance. The collective coverage provided by the sensors 320 may define the effective extent of the area under surveillance. According to some examples, the sensors 220 may be positioned uniformly on a grid pattern throughout the area under surveillance. The grid may be a square grid, hexagonal grid, or other distributed pattern. The spatial period of the distribution pattern may be related to a coverage distance associated with each sensor 220. The periodic positioning of the sensors 220 may be altered to accommodate structures within the environment such as walls, stairwells, mechanical systems, and so forth. The periodic positioning of the sensors 220 may be altered to accommodate infrastructure feeds such as power and interface points for the network 250. For example, the interface points for the network 250 might be Ethernet ports.

Designing a location plan for the sensors 220 may start by receiving a floor plan of the proposed area under surveillance. Locations for available power and interface points for the network 250 may be identified. Sensor locations may be selected to form an approximately uniform grid, or other spatial distribution, constrained to the identified infrastructure locations. The sensors 220 may then be deployed at these locations. Once the sensors 220 are collecting signals, the number of packets, or other identified signal features, may be tracked such that sensors 220 collecting low numbers may be evaluated as potentially covering low traffic areas. Such low traffic sensors 220 may be re-positioned or spaced out to improve aggregate reception efficiency. Designing a location plan for the sensors 220 in this fashion may be referred to as surveillance area survey planning.

Other example sensor survey mechanisms may involve calculating the expected performance of a given sensor layout using physics-based or statistics-based models. For example, a physics-based model may calculate link budgets from points within the area under surveillance to each sensor 220. From these link budgets, it may be possible to characterize how many sensors 220 would be able to see a given point in the area under surveillance on average. According to other examples, statistics-based site surveys may involve modeling the distribution of received signal strength values for each various pairings of a sensor 220 to a point in space within the area under surveillance. Statistical estimation techniques, such as the Cramer-Rao bound, may be used to establish a sensor location plan from the modeled signal strength values. For example, a bound may be determined for the base-case localization error over selected points within the area under surveillance.

Other types of attacks may also be possible, and may be detected by these systems. One additional example attack type that may occur within the electromagnetic environment can involve a wireless device 210 configured as a malicious agent. The malicious agent may be configured as a rogue wireless access point to target other wireless devices 210 as victims. The rogue wireless access point may provide an unapproved wireless local area network, such as a Wi-Fi network. According to certain examples, legitimate users of wireless devices 210 may scan for available wireless networks and find the rogue network that has been intentionally named to appear as a trustworthy wireless network within the organization. In some instances, one or more of the wireless device 210 may automatically, or manually, connect to the malicious Wi-Fi network after assuming it to be trustworthy. Once connected, the malicious agents may attempt to obtain passwords, bank account details, employment records, or other types of sensitive information from the victim wireless device 210. Also, the malicious agents may add malicious code to the victim wireless device 210 allowing further malicious actions against the victim, other victims, or the network in general.

The application of an electromagnetic signal collection and analysis system as presented herein can provide an area of enhanced wireless security against such malicious agents. With respect to the rogue wireless Zigbee access example attack, the signal analysis system 330 may be configured to parse the malicious Zigbee signal and determine that the malicious device is broadcasting a Zigbee signal to create an unauthorized wireless Zigbee network. The signal analysis system 330 can send a notification to an appropriate security system or appropriate personnel. The notification may be made via the console 340 and may include an estimated location for the malicious device.

It should be appreciated that wireless security threats may take many different forms, such as viruses, malware, spyware, and so forth. The threats may be transmitted through a variety of different channels, such as different frequencies, protocols, or wireless services. The threats may be designed to accomplish a variety of nefarious tasks such as shutting systems down, stealing information, denial of service attacks, device spoofing, and so forth. The electromagnetic threats may originate from any type of malicious, unauthorized, or rogue wireless devices.

The technology presented herein may support detecting and classifying wireless attacks on wireless devices 210 and networks, as well as attacks directed at humans within an environment as well. For example, the systems may be used to identify short microwave pulses that may be characteristic of intentionally-malicious pulses that may be harmful to users in the environment. The systems may also be capable of detecting any other types of malicious attacks directed toward users and/or devices in the environment as well. The technology presented herein may also support geolocating rogue, unauthorized, or malicious wireless devices 210. The technology presented herein may also support identifying data transfer event and estimating the amount of data being transmitted from a wireless device 210 using time-frequency physical-layer measurements of the electromagnetic environment. The technology presented herein may also support classifying the modes of wireless connectivity between wireless devices 210 using time-frequency, physical-layer measurements of the electromagnetic environment.

The console 240 can provide a user interface for security personnel or system administrators to obtain visibility into operations of the signal analysis system 330 and determinations about the various wireless devices 210 made from the electromagnetic environment. The signal analysis system 230 may localize, monitor, record, and playback the position and activity of the various wireless devices 210, including suspected rogue, unauthorized, or malicious devices. A system administrator, or other users, may use the console 340 to discover, localize, and otherwise analyze a malicious wireless device 210 operating within a wireless infrastructure. The administrator may be provided with a visualization of the position of the wireless devices 210 in the environment. The visualization may include metadata for each of the wireless devices 210. For each given wireless device 210, the metadata may include physical layer specifications such as modulation, protocols, symbol rates, bandwidths, or frequencies; a likelihood metric that the device is rogue, unauthorized, or malicious; a type of attack, if any, being employed by the device; and other wireless devices 210 that the particular device is likely to be communicating with. As aforementioned, the user interface may also allow the user to configure parameters used by the sensors 220A-220E, may present alerts to a user, may provide an indication of a source of a short pulse microwave signal (or any other signal), and/or may provide any other types of functionality for a user.

The technology presented herein may support detecting, locating, and classifying infected wireless devices 210. Infected wireless devices 210 may have become susceptible to malicious software, causing the device to perform one or more undesired behaviors. Such behaviors may include disrupting other wireless devices 210, infecting other wireless devices 210, surreptitiously recording and transmitting audio/video, transmitting sensitive data to a third party, other attacks presented herein, or any combinations thereof. The signal analysis system 330 may address such threats by detecting, geolocating, and classifying signals characteristic of infected wireless devices 210. The signal analysis system 330 may alert a user, such as an administrator, to the location of the infected wireless device 210. The alert may be provided via, or in association with, the console 340.

The technology presented herein may support detecting, locating, and classifying wireless devices 210 that are susceptible to wireless attack. In addition to inherent weaknesses in certain devices, protocols, or software versions, an attacker may attempt to place a target wireless device 210 into an insecure or vulnerable state as a precursor to the actual attack. While many wireless devices 210 implement countermeasures to prevent them from being infected with malicious software or otherwise compromised, attacks may attempt to override or otherwise circumvent these protections. As examples, encryption and secure authentication intended to prevent wireless attacks, may be circumvented. A condition where a wireless device 210 has been placed into such a vulnerable state may be observed from the radio emissions of the wireless device 210. The signal analysis system 330 may detect, geolocate, and classify signals characteristic of vulnerable devices.

One example of detecting a wireless device 210 that may be susceptible to wireless attack is identifying that a mobile telephone that is operating in 2G mode even when 3G or 4G modes are available on the device and from the service provider. A threat may be in play to snoop text (SMS) messages since the 2G standard may send such messages without encryption. Where sensitive information, such as a password reset code, is transmitted using text (SMS) messages and an attacker has forced the mobile telephone into 2G mode, the sensitive information may be compromised.

Another example of detecting a wireless device 210 that may be susceptible to wireless attack, is identifying that a Bluetooth device is configured to allow for unauthenticated pairings of other Bluetooth devices. An attacker can take advantage of such an open pairing state to connect to a Bluetooth device and extract data or install malicious software.

The technology presented herein may support detecting, locating, and classifying wireless signal jamming attacks. Wireless systems are generally susceptible to jamming attacks where a malicious actor transmits wireless signals with the intent of blocking the wireless function of other wireless devices 210 in the vicinity. Radio jamming may be implemented as a barrage of radio frequency noise. More sophisticated jamming may involve a jamming signal that is crafted to efficiently and specifically target only a subset of wireless systems in the environment that are operating on certain frequencies, using certain modulation techniques, or implementing certain protocols. The signal analysis system 330 may detect, geolocate, and classify jamming signals.

The technology presented herein may support detecting, locating, and classifying impersonation attacks. Various wireless systems may be susceptible to impersonation attacks where a malicious actor transmits wireless signals with the intent of impersonating a recognized wireless signal. The objective of such an attack may be to control, block, or collect information from a wirelessly connected system. Such an attack may also target wireless mesh networks, where, through a variety of impersonation techniques, the attacker may change the network behavior to achieve malicious objectives. The following four examples demonstrate how impersonation attacks may threaten various types of systems. It should be appreciated that these are only examples, and various other types of impersonation attacks may be detected, located, classified, and thwarted according to the technology presented herein.

A first example of an impersonation attack is against a building control and automation system that uses wirelessly connected temperature sensors to control the heating and cooling of a building. A wireless impersonation attack can impersonate the temperature sensors to wirelessly signal a low temperature, thereby causing the heating system to heat the building. If, for example, the heating system is associated with a critical data center, excessive heat could destroy computer hardware or other systems in the data center.

A second example of an impersonation attack involves mobile or cellular wireless systems. In a mobile or cellular wireless system, base station equipment is generally installed and operated by a mobile carrier to support connections from user equipment wireless devices 210. These wireless devices 210 include user equipment mobile devices such as telephone handsets, smartphones, paging devices, data hotspots, and so forth. A malicious agent may provide an impersonated base station that advertises to user equipment wireless devices 210 that it is a base station from the mobile carrier supporting voice and data service. A user equipment wireless device 210 may unsuspectingly connect to the impersonated base station and route data and voice traffic through the impersonated base station. The impersonated base station may then maliciously read and modify data and voice content associated with the user equipment wireless device 210. User equipment wireless devices 210 often trust the base station they are connected to as having the authority of the mobile carrier provider and thus allow remote updating and installation of software or firmware through the base station. Accordingly, malicious actors may leverage impersonating base stations to install and execute unauthorized software on user equipment wireless device 210.

A third example of an impersonation attack involves wireless devices 210, such as onboard wireless sensors associated with automotive systems. These sensors may be associated with temperature, braking, tire pressure, fluid levels, safety systems, or any other components of a vehicle. As an example, a tire pressure sensor may act as a wireless device 210 that transmits tire pressure to a vehicle control computer. In such a system, tire pressure measurements outside of a specified acceptable operating range, may cause the vehicle control computer to alert the driver, limit the speed of the vehicle, signal for roadside assistance, or carry out other specified reactions. A wireless attacker impersonating such a tire pressure sensor may cause such reactions to occur inappropriately, or block them from occurring as they were intended.

A fourth example of an impersonation attack involves a building security system. Building security systems often include building sensors acting as wireless devices 210. These building sensors may include door sensors, glass-break sensors, motion sensors, thermal sensors, and so forth. Measurements or signals from the building sensors may be used by the building security system to determine whether or not to signal an alarm event. A wireless attacker can impersonate signals from building sensors to disguise an unauthorized entry into the building, to cause a false alarm, or otherwise interfere with building security systems functionality.

The technology presented herein may support detecting, locating, classifying, and thwarting attacks associated with spoofing control information within a wireless network. By spoofing routing information, a malicious wireless device 210 can disrupt the wireless network by creating inefficient network routes, attracting network traffic, force network traffic away from intended destinations, or otherwise disrupting or preventing normal network operations. Similarly, a malicious wireless device 210 might spoof medium access control information, or other addressing information, to configure network nodes into a vulnerable state.

The technology presented herein may support detecting, locating, classifying, and thwarting attacks associated with sinkhole or black hole attacks on a wireless network. According to certain examples of such an attack type, a malicious wireless device 210 may attempt to lure network routes to pass through it by advertising advantageous link quality. This may result in creating a critical point where many or all, routes pass and thus become exposed to network disruption, data siphoning, or various other exploits.

The technology presented herein may support detecting, locating, classifying, and thwarting attacks associated with selective dropping or selective forwarding attacks within a wireless network. According to certain examples of such an attack type, a malicious wireless device 210 may attempt to drop certain critical network packets in order to degrade network performance or to force a new network topology.

The technology presented herein may support detecting, locating, classifying, and thwarting attacks associated with Sybil attacks within a wireless network. According to certain examples of such an attack-type, malicious wireless devices 210 may advertise themselves in different ways to different unsuspecting wireless device 210 nodes in the network. By doing so, a malicious wireless device 210 can appear to be multiple nodes, thereby subverting security mechanisms that depend on network redundancy and distribution routing. Since fault-tolerant schemes may depend upon broad network consensus to detect malicious nodes, a Sybil attack advertising a malicious wireless device 210 as multiple nodes can cast multiple votes and overrun the consensus ballot box making the network appear secure to other unsuspecting wireless device 210 nodes.

The technology presented herein may support detecting, locating, classifying, and thwarting attacks associated with Hello flood attacks within a wireless network. According to certain examples of such an attack-type, malicious wireless devices 210 may exploit networks employing routing algorithms where a Hello packet advertises nodes. Malicious wireless devices 210 may break medium access rules and transmit with high power to advertise itself to even distant network nodes. Hello flood attacks may also be used to establish a sinkhole, carry out a Sybil attack, or perform other network security exploits.

The technology presented herein may support detecting, locating, classifying, and thwarting attacks associated with wormhole attacks on a wireless network. According to certain examples of such an attack-type, when two malicious wireless devices 210 have access to a low-latency link outside of the wireless network, the pair can create the perception within the network that they are artificially close to other wireless device 210 nodes in the network, as though they provide a wormhole through the network. Wormhole attacks can be used to force a network to converge on an inefficient routing topology. Wormhole attacks can also be used to win routing races and, more effectively, spoof other network nodes.

The technology presented herein may support detecting, locating, classifying, and thwarting attacks associated with badmouthing or blacklisting attacks within a wireless network.

According to certain examples of such an attack-type, malicious wireless devices 210 may exploit consensus trust mechanisms intended to detect errant behavior. A malicious wireless device 210 can degrade the network by reporting legitimate network nodes as suspicious. When coupled with a Sybil attack, a malicious wireless device 210 can amplify the effect of the blacklisting by replicating mistrust reports from multiple impersonated nodes.

The technology presented herein may support detecting, locating, and classifying wireless transmissions from wireless device 210 in an unauthorized area. Certain areas, at certain times, may be unauthorized for certain types of wireless transmissions. For example, medical facilities with sensitive medical equipment may be unauthorized for any wireless transmission that may potentially interfere with the medical equipment. As another example, aircraft during takeoff and landing may be unauthorized for Wi-Fi or mobile carrier communications. Various similar authorization restrictions may exist in call centers, offices dealing with sensitive personal information, military installations, or otherwise secure government facilities.

The technology presented herein may support detecting, locating, and classifying auxiliary wireless devices 210 associated with cyber security attacks or physical security attacks. In such attacks, wireless signals may be used in conjunction with other malicious methods to perpetrate physical and cyber attacks. Broadly speaking, wireless systems may be used to allow the attacker remote access. Wireless systems may also be used to control an attack infrastructure. One example of such a threat may involve card skimming at point-of-sales systems or automated teller machines. An attacker may position covert hardware to a card reader slot such that the covert hardware is not noticeable by users who freely slide their cards into the point of sale systems or automated teller machine. The covert hardware may store information associated with scanned cards to be wirelessly collected to a remote location.

Figure 9:
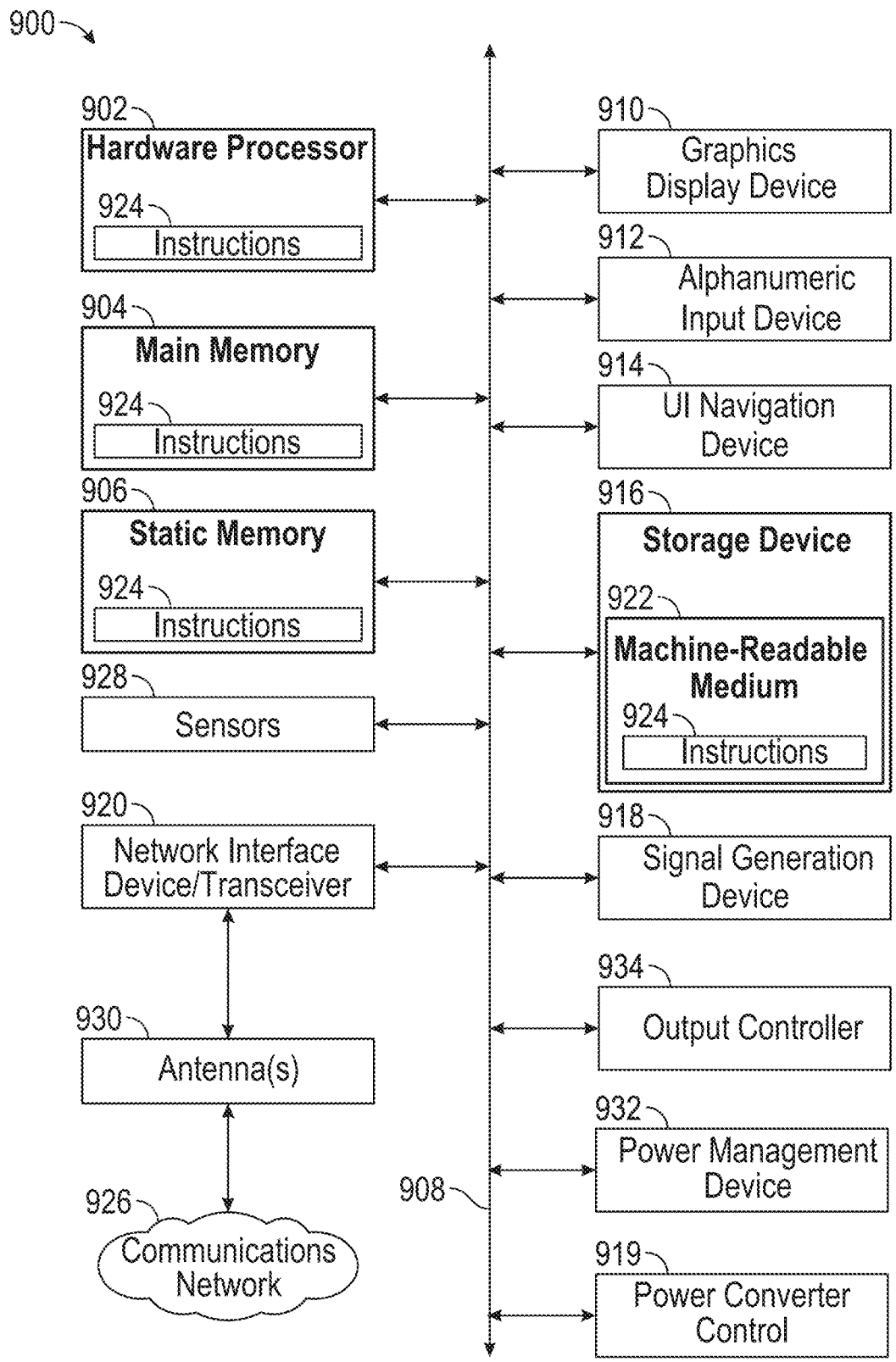
FIG. 9 illustrates an example of a computing system, in accordance with one or more embodiments of this disclosure.

The wireless devices 210, sensors 120, signal analysis system 330, console 340, or any other systems associated with the technology presented herein may be any type of computing machine such as, but not limited to, those discussed in more detail with respect to FIG. 9. Furthermore, any modules associated with any of these computing machines or any other modules (scripts, web content, software, firmware, or hardware) associated with the technology presented herein may be any of the modules discussed in more detail with respect to FIG. 9. The devices and computing machines discussed herein may communicate with one another as well as other computer machines or communication systems over one or more networks, such as network 250. The network 250 may include any type of data or communications links or network technology including any of the network technology discussed with respect to FIG. 9.

Figure 3:
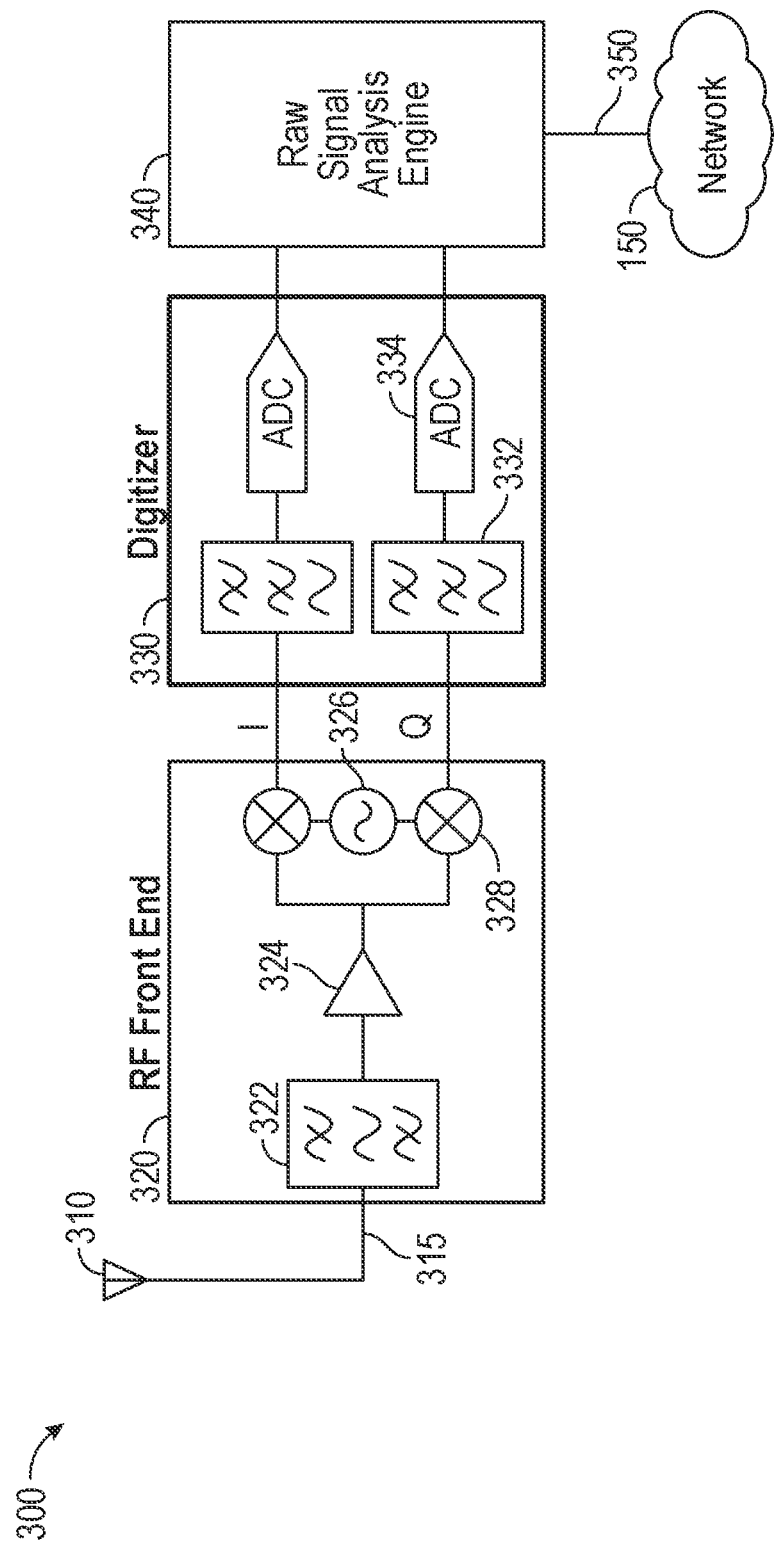
FIG. 3 illustrates a block diagram depicting a sensor incorporating a software-defined radio receiver, in accordance with one or more embodiments of the disclosure.

FIG. 3 is a block diagram depicting a sensor 300 incorporating a software-defined radio receiver in accordance with one or more embodiments presented herein. The sensor 300 may be another embodiment of a sensor 300 that may be employed in addition to the sensors 120 depicted in FIG. 1. The sensor 300 and sensor 120 may also share similar elements. An antenna 310 may receive a radio frequency signal 315. The radio frequency signal 315 may be coupled into a radio frequency front end 320. The radio frequency front end 320 may condition the radio frequency signal 315 to generate an analog output signal. The analog output signal may comprise in-phase and quadrature components referred to as I and Q signals. The analog output from the radio frequency front end 320 may be coupled to a digitizer 330. The digitizer can output data that is a digital representation of the analog output generated by the radio frequency front end 320. The digital representation may be sampled in time and quantized in amplitude. The digital representation may also comprise separate I data and Q data. A raw signal analysis engine 340 may receive and process the raw digital representation generated by the digitizer 330. A raw signal analysis output 350 may be the result of processing associated with the raw signal analysis engine 340 (which may be the same as signal analysis system 24). The raw signal analysis output 350 may be communicated onto the network 150 for further processing.

The antenna 310 may be used to collect a broad range of radio frequency signals from the electromagnetic environment for analysis. The antennas 310 may use various antenna geometries. According to certain examples, the antennas 310 may be directional antennas, monopoles, dipoles, patch antennas, yagis, parabolic, horns, loops, reflector antennas, beam antennas, or any other type of structure configured to become electrically excited by radio frequency electromagnetic radiation of a desired frequency, polarization, or propagation direction. The antennas 310 can be located in various locations around a room, around a building, or within different areas or floors of a building.

According to certain example embodiments of the radio frequency front end 320, a radiofrequency band-pass filter 322 can select a channel, or a frequency range, from the radio frequency signal 315. A low noise amplifier 324 may be used to increase the amplitude of the signal from the selected channel. A signal from a variable-frequency oscillator 326 may be combined, or mixed, with the radio frequency signal by a mixer 328. Mixing the radio frequency signal with both the signal from a variable-frequency oscillator 326 and an out-of-phase copy of the oscillator output may be used to generate both in-phase and quadrature (I and Q) components. The frequency of the variable-frequency oscillator 326 may be tuned to down-convert the radio frequency signal to a lower frequency such as baseband, an intermediate frequency, or some other local oscillator frequency.

According to certain example embodiments of the digitizer 330, a low-pass filter 332 may be applied to the I and the Q signals from the radio frequency front end 320. The low-pass filter 332 may be useful as an anti-aliasing filter before digitizing the signal. An analog-to-digital converter (ADC) 334 can convert the continuous analog signal into a digital value that represents a time sampling of an amplitude associated with the continuous signal. The sampling may be quantized in amplitude and may be periodic in time. The mathematical inverse of this sampling period may be referred to as the sampling frequency. The output of the ADC 334 may be a sampled sequence of digital values that have been converted from a continuous-amplitude and continuous-time analog signal to a discrete-amplitude and discrete-time digital signal. According to certain embodiments, both I and Q signal components may be separately filtered and converted. Accordingly, there may be two separate low-pass filters 332 and two separate analog-to-digital converters 334.

The raw signal analysis engine 340 may be implemented in software, firmware, programmable logic, or other such flexible technology. Accordingly, the raw signal analysis engine 340 may be considered as (all or part of) the software portion of the software-defined radio receiver. The raw signal analysis engine 340 can process a digital representation of the raw collected radio frequency signal 315. The raw signal analysis engine 340 may receive digital I and Q signal samples from the digitizer 330. The received samples may be processed and refined to a discrete set of feature vectors. A signal feature vector may be a set of values representing attributes of the signal. The attribute information can describe one or more signal features of a communicated signal within the radio frequency signals. Feature vectors may be passed from one stage of analysis or processing to another. At each step, attributes may be added or subtracted from the feature vector, further refining the attributes of the particular signal. Such refinement of the feature vector may support identifying, classifying, or otherwise interpreting the content of the signal. During this hierarchical and/or iterative interpretation of the signal, various modifiers or descriptors indicating features or attributes of the signal may be appended to the feature vectors at each processing step. Some examples of these modifiers or descriptors may include geolocation parameters, signal duration, signal bandwidth, signal angle, modulation type, and so forth. It should be understood that the feature vectors may be processed and re-processed by the raw signal analysis engine 340 any number of times in order to refine description of signal contents from the collected radio frequency signal 315.

The raw signal analysis engine 340 may generate a raw signal analysis output 350. The raw signal analysis output 350 may be a condensed collection of intelligible features and data as identified within the collected radio frequency signal 315. According to one or more embodiments, the signal data may be processed and refined into feature vectors that define various attributes of the signal. The raw signal analysis output 350, including such feature vectors, may be transmitted onto the network 150 for further processing and analysis. This processing and analysis may be carried out in association with the signal analysis system 230.

It should be appreciated that aspects of the receiver presented herein may be programmable, adjustable, or otherwise controllable. In addition to the software (or otherwise flexible) portion of the receiver, agility, and configurability may be supported by elements of the radio frequency front end 320 and the digitizer 330 that are programmable, adjustable, or otherwise controllable. Parameters associated with these elements may include a pass-band of the band-pass filter 322, a gain of the low noise amplifier 324, a frequency of the oscillator 326, a cut-off response of the low-pass filter 332, a sampling rate of the ADC 334, and so forth.

It should be appreciated that while certain example sensors 120 presented herein may be software-defined radios, other example sensors 120 may be hardware-defined radios or simply hardware radios. Generally, a hardware radio is fixed to operate on predefined frequencies, bandwidths, modulation techniques, coding, protocols, and wireless communications standards. For example, a hardware radio may be specifically designed to receive one specific standard, such as Wi-Fi signals, Bluetooth signals, or mobile telephone signals. In contrast, a software-defined radio may be reconfigurable using software to handle any number of different communication standards, even custom or otherwise non-standards-driven wireless communications. It should be appreciated that a hardware radio is often highly integrated, specifically designed for its single purpose, and thus considerably less costly to implement than a software-defined radio. Accordingly, it may be said that there is a tradeoff between cost and flexibility when comparing hardware radios and software-defined radios. Software-defined radios are generally much more flexible but considerably more costly, while hardware radios are generally less flexible but also less costly.

It should be appreciated that, according to certain embodiments, the sensors 310 presented herein as part of an electromagnetic monitoring and detection network may share hardware and/or software resources with production networks used by wireless devices 310 associated with end-users. For example, a sensor 310 used for monitoring the electromagnetic environment may also be used to supply certain wireless communications features. According to certain examples, wireless communication components (such as wireless access points) that support wireless communications for a production network of an origination may integrate features and functionality presented herein for collecting electromagnetic signals for signature or threat analysis.

Figure 4:
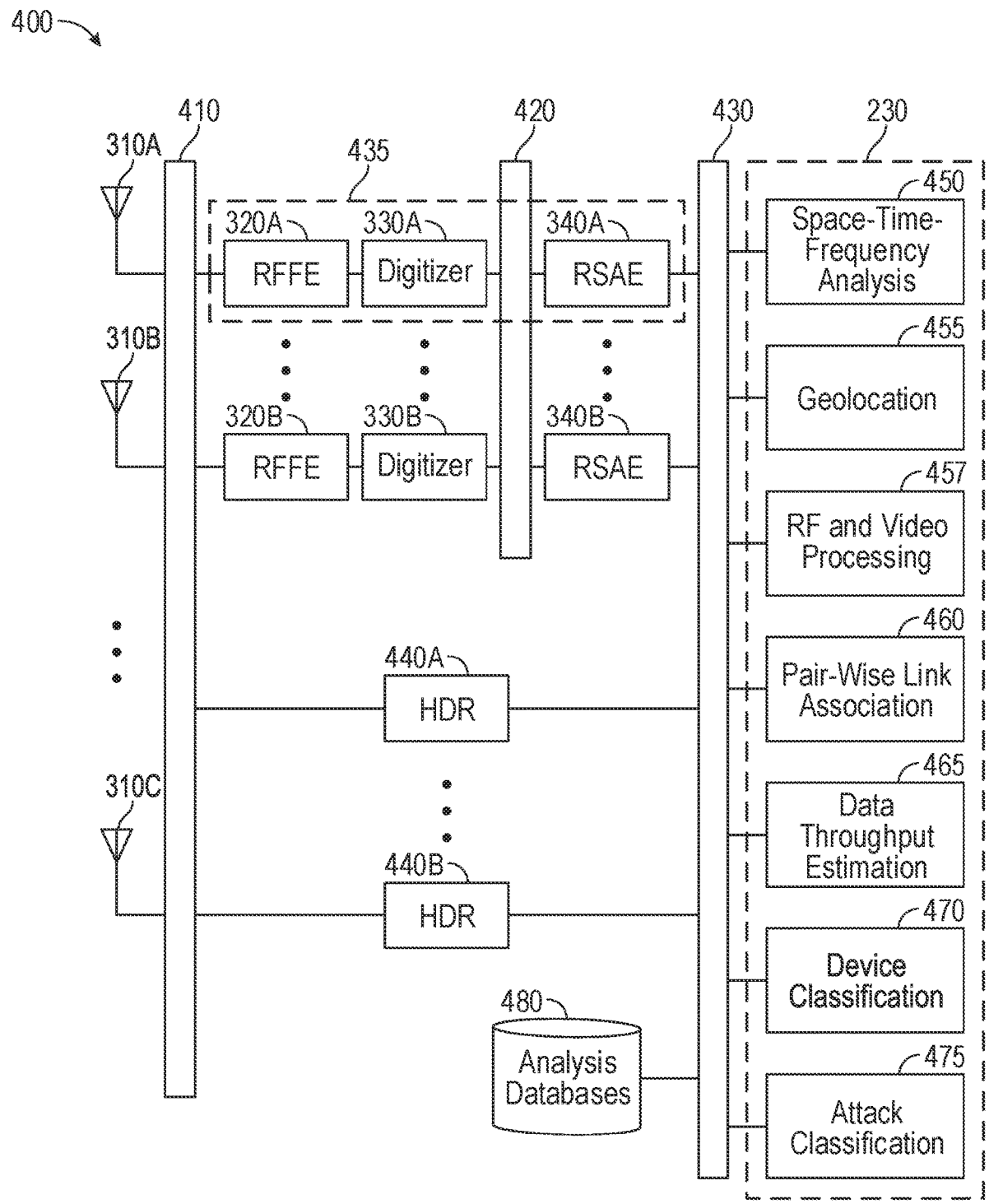
FIG. 4 illustrates a block diagram depicting a processing architecture for electromagnetic signature analysis, in accordance with one or more embodiments of the disclosure.

FIG. 4 is a block diagram depicting a processing architecture 400 for electromagnetic signature analysis in accordance with one or more embodiments presented herein. A plurality of antennas 310 may be coupled to one or more receivers via an antenna signal-switching network 410. Although the antennas are defined as "antennas 310," the antennas may similarly be antennas associated with any other type of sensor other than the sensor 300 depicted in FIG. 3, such as sensor 120 depicted in FIG. 1, for example. The same may be applicable to any of the other elements of the software-defined radios 435 as well. The receivers may comprise one or more software-defined radios 435. The receivers may also comprise one or more hardware-defined radios 440A-440B. The hardware-defined radios 440A-440B may be referred to, in general, or collectively, as hardware-defined radios 440 or a hardware-defined radio 440. Each of the software-defined radios 435 may comprise a radio frequency front end 320, a digitizer 330, and a raw signal analysis engine 340. The raw signal analysis engines 340 may be coupled to the digitizers 330 via a raw digital signal switching network 420. The outputs of the receivers, both the software-defined radios 435 and the hardware-defined radios 440, may be coupled through one or more layers, or stages, of a signal feature vector network 430. Various modules associated with the signal analysis system 230 may further process these receiver outputs. These modules may include, for example, space-time-frequency analysis 450, geolocation 455, RF and video processing 457, pair-wise link association 460, data throughput estimation 465, device classification 470, and attack classification 475. Operations of the raw signal analysis engine 340 and/or the various modules associated with the signal analysis system 230 may be supported by various analysis databases 480.

The antenna signal-switching network 410 can support switching and routing radio frequency signals 215 received by the antennas 310 to various radio receivers. Accordingly, the antenna signal-switching network 410 may be referred to as an antenna feed network. The radio receivers may include both the software-defined radios 435 as well as the hardware-defined radios 440. The radio frequency signals 215 may be coupled from the antennas 310 using coaxial cable or other conductive transmission line or waveguide technology. The radio frequency signals 215 may also be coupled from the antennas 310 using radio frequency to optical converters, optical modulators, radio-over-fiber technology, or other techniques for transmitting the signal over optical fiber or other optical waveguides. The radio frequency signals 215 may be switched within the antenna signal-switching network 410 using mechanical switches, electro-mechanical switches, radio frequency switches, semiconductor switches, optical switches, electro-optical switches, or other signal path-switching technology.

The antenna signal-switching network 410 can support switching and routing the radio frequency signals 215 from one particular antenna 310 between some or all of the receivers within the system. According to certain embodiments, the antenna signal-switching network 410 may be fully interconnected, wherein any of the antennas 310 may be switched to any of the receivers. According to certain other embodiments where the antenna signal-switching network 410 may support a lesser degree of interconnectivity, a subset of the antennas 310 may be switchable between a subset of the receivers. According to some embodiments, certain receivers may be directly coupled to certain antennas 310 without being switchable.

The antenna signal-switching network 410 may comprise various switching topologies such as matrix, crossbar, one-to-many, many-to-one, fan-out, sparse fan-out, star, ring, any other structure, or any combination thereof. The antenna signal-switching network 410 may be controlled manually or automatically by any of the computing machines or modules presented herein. The antenna signal-switching network 410 may comprise one or more direct radio frequency interconnections, one or more radio frequency signal switches, one or more radio frequency signal splitters, and various other mechanisms for switching and routing radio frequency signals.

One reconfiguration example associated with the antenna signal-switching network 410 may involve receiving a Bluetooth wireless signal. According to the example, upon determining that the particular radio frequency signal 215 detected at a particular antenna 310 contains a Bluetooth signal, the signal analysis system 230 may use the antenna signal-switching network 410 to redirect that particular radio frequency signal 215 from a software-defined radio 435 instead of to a hardware-defined radio 440 specifically designed to receive and decode Bluetooth signals. Such automated reconfiguration may improve specialized decoding of the Bluetooth signal while also freeing resources within the software-defined radio 435 from tasks more efficiently suited to the appropriate hardware-defined radio 440. It should be appreciated that while Bluetooth was specified in this signal path reconfiguration example, the same benefits may apply to wireless communication modalities other than Bluetooth, where an appropriate hardware-defined radio 440 is available to offload tasks from a software-defined radio 435. The same may apply to short microwave pulses and/or any other type of signal as well.

It should also be appreciated that while the Bluetooth signal-path reconfiguration example used a Bluetooth signal received at a software-defined radio 435 to cue switching the radio frequency signal 215 to a hardware-defined radio 440, other example scenarios may involve a signal received at a hardware-defined radio 440 being used to cue switching the radio frequency signal 215 to a software-defined radio 435. For example, the radio frequency signal 215 may be redirected to a software-defined radio 435 that is capable of smart-antenna processing while the original hardware-defined radio 440 was configured to handle only one radio frequency input. Smart-antenna processing can combine the radio frequency signal 215 from two or more antennas 310. This may be referred to as beam forming, MIMO, and so forth. Multiple antenna sources may be combined in order to directionally discriminate the source wireless device 310 for a desired electromagnetic emission. Such directionality may be computationally obtained from multiple antenna sources instead of physically orienting a directional antenna. Directionality can support extracting a weak signal, differentiating a signal from various interferers, or otherwise improving reception of a signal that presented poorly at a single antenna 310 or even multiple original antennas 310. The antenna signal-switching network 410 can support matching the proper antennas 310 to the proper receiver inputs for optimizing smart-antenna processing. While one or more of the hardware-defined receivers 440 may be configured to support smart-antenna processing through multiple antenna inputs, the software-defined receivers 435 may inherently support smart-antenna processing through computationally combining the sampled signals from multiple digitizers 330 during the software portion of the receiver operation.

The antenna signal-switching network 410 may also incorporate one or more splitters. The splitters may be used to replicate the particular radio frequency signal 215 a number of times for distribution to two or more receivers. For example, a hardware receiver 440 may be assigned to extract a Wi-Fi signal from the radio frequency signal 215 at the same time that a copy of the radio frequency signal 215 may be routed to a software-defined receiver 435 to process some other signals detected at the same antenna 310. According to certain embodiments, smart-antenna processing can cue combining of signals within the antenna signal-switching network 410. It should be appreciated that the number of antennas 310 and the number of receivers may not be the same. For example, there may be additional antennas 310 to allow a choice of which antennas 310 may be routed to the receivers through the antenna signal-switching network 410. According to other embodiments, there may be fewer antennas 310 than receivers, or the numbers may be similar or even the same.

The antenna signal-switching network 410 can support intelligent allocation of the radio frequency signal 215 from the various antennas 310 to the various receivers. For example, complicated signal analysis cases, or those requiring directional processing, may be routed to one or more software-defined receivers 435 while signals may be routed to efficient and inexpensive hardware-defined radios 440 where appropriate. The more flexible the antenna signal-switching network 410, the more optimally the signal processing allocation may be made between the various resources within the system.

The software-defined radios 435 generally comprising radio frequency front ends 320, digitizers 330, and one or more digital signal processing stages to computationally process outputs from the digitizers 330. The digital signal processing stages may include the raw signal analysis engines 340. The digital signal processing stages may also include one or more modules associated with the signal analysis system 230. These modules may include, among other example modules, space-time-frequency analysis 450, geolocation 455, pair-wise link association 460, data throughput estimation 465, device classification 470, and attack classification 475. It should be appreciated that in addition to the illustrated embodiment that separates the raw signal analysis engines 340 from the signal analysis system 230, various other embodiments may incorporate the raw signal analysis engines 340 with one or more of the modules associated with the signal analysis system 230. Such incorporated digital signal processing stages may be considered either (or both) part of the raw signal analysis engines 340 or part of the signal analysis system 230 without departing from the scope or spirit of the technology presented herein.

The raw signal analysis engine 340 may receive digitally sampled I and Q signals from the digitizer 330. The raw signal analysis engine 340 can process this digital representation of the raw collected radio frequency signal 215 to generate a discrete set of feature vectors. For example, the raw signal analysis engine 340 may perform time-frequency analysis of the radio frequency signal 215 from a particular antenna 310. The time-frequency information from the radio frequency signal 215 may be encoded as a feature vector. For example, time-frequency bins may be defined, and the spectral intensity of the radio frequency signal 215 corresponding to each time-frequency bin may be represented within the feature vector. The raw signal analysis engine 340 may also perform angle analysis where an angle dimension for the radio frequency signal 215 may be added to each feature vector. The raw signal analysis engine 340 may also perform modulation classification and signal decoding, where feature vectors may be refined by appending dimensions representing additional features associated with modulation and decoded signal contents.

The raw digital signal switching network 420 can switch and route the outputs from one or more digitizers 330 to the inputs of one or more raw signal analysis engine 340. The output from each digitizer 330 may be a stream of digital I signal samples and digital Q signal samples. The I and Q samples may be communicated as two separate streams or as a single combined or interleaved stream. These streams may be routed to the appropriate raw signal analysis engines 340 at packetized data or as a clocked (or asynchronous) stream of parallel or serialized data. Switching and routing within the raw digital signal switching network 420 can allocate the output of each digitizer 330 to the most appropriate and available raw signal analysis engine 340 according to one or more metrics such as route distance, resource capacity, performance, availability, cost, and so forth.

The signal feature vector network 430 can switch and route signal feature vectors between the raw signal analysis engines 340 and the various other modules associated with the signal analysis system 230. The signal analysis system 230 may comprise a signal aggregation and analysis engine comprised of one or more feature vector processors. The signal feature vectors may be transported within the signal feature vector network 430 as packetized data or streaming data. Generally, a signal feature vector may be a set of values representing attributes of a particular signal. In various embodiments, as a feature vector is passed from one processing module or stage to the next, attributes may be added or subtracted from the feature vector, further refining the attributes of the particular signal to better identify and/or classify the contents of the signal. Feature vectors may be appended for various feature attributes relevant to the processing at each module or processing stage. According to one particular example, a geolocation feature vector may indicate a feature vector that has geolocation features added to its set of attributes. The geolocation feature vector may include, the specific geolocation features of the signal, as well as values indicating duration of the signal, bandwidth of the signal, angle of the signal, a modulation type of the signal, and so forth.

The radio frequency signals 215 captured from the electromagnetic environment by the sensors 120 may be used in detecting, classifying, and mitigating wireless attacks against one or more wireless devices 210. Various digital signal processing stages may be applied to the signals collected by the sensors 120. These digital signal processing stages may comprise modules of the signal analysis system 230, including one or more raw signal analysis engines 340. Various sensor mesh architectures comprising the sensors 120, the antenna signal-switching network 410, the raw digital signal-switching network 420, and the signal feature vector network 430 can support collecting and appropriately transporting signals from the electromagnetic environment for signature and wireless threat analysis. Similarly, various processing architectures comprising modules of the signal analysis system 230, including one or more raw signal analysis engines 340, can support the various processing states of these signals for signature and wireless threat analysis.

The signal analysis system 230 can aggregate and process the various radio frequency signals 215 captured from the electromagnetic environment by the sensors 120. Example modules of the signal analysis system 230 may include space-time-frequency analysis 450, geolocation 455, pair-wise link association 460, data throughput estimation 465, device classification 470, and attack classification 475. It should be appreciated that the various modules of the signal analysis system 230 may receive sampled signals and/or signal feature vectors from one or more software-defined radios 435. Similarly, any data, packets, signal levels, channel parameters, error conditions, or other parameters obtained by one or more hardware-define radios 440 may be relayed to the various modules of the signal analysis system 230 for processing. Since a hardware-defined radio 440 may perform its own raw signal analysis and output information specific to its design, outputs from various hardware-define radios 440 may be translated to radio-specific signal feature vectors. These particular signal feature vectors may be limited by the particular output space of any given hardware-define radio 440.

The analysis databases 480 may include, among various other examples, signal databases, sensor position databases, calibration databases, signal signature databases, and attack databases. One or more of the signal processing and threat analysis stages of the signal analysis system 230, including the raw signal analysis engines 340, may leverage the analysis databases 480. The analysis databases 480 may contain various forms of information useful in analyzing the radio frequency signals collected by the sensors 120. Portions of the information within the analysis databases 480 may be preinstalled at the purchase, installation, or configuration of the sensors 120, the signal analysis system 230, and/or other systems supporting the technology presented herein. Portions of the information within the analysis databases 480 may be configured in the field. Such configuration may be performed manually, or autonomously through automated learning, tuning, or adaptation procedures. Portions of the information within the analysis databases 480 may be updated from time to time from a central provider, from backups, or from other installations. One or more central providers may receive related information that was learned or adapted in fielded installations. The received information may be incorporated into periodic updates provided by the central provider to the various fielded installations of the technology presented herein.

The raw signal analysis engine 340, signal analysis system 230, systems associated with the analysis databases 480, or any other systems associated with the technology presented herein may be any type of computing machine such as, but not limited to, those discussed in more detail with respect to FIG. 18. Furthermore, any modules (such as those associated with space-time-frequency analysis 450, geolocation 455, RF and video processing 457, pair-wise link association 460, data throughput estimation 465, device classification 470, or attack classification 475) associated with any of these computing machines or any other modules (scripts, web content, software, firmware, or hardware) associated with the technology presented herein may be any of the modules discussed in more detail with respect to FIG. 18. The computing machines discussed herein may communicate with one another as well as other computer machines or communication systems over one or more networks, such as the antenna signal-switching network 410, the raw digital signal-switching network 420, and the signal feature vector network 430. It should be appreciated that the antenna signal-switching network 410, the raw digital signal-switching network 420, and the signal feature vector network 430 may be associated with or share resources with the network 150. These networks may include any type of data or communication links or networks, including any of the network technology discussed with respect to FIG. 18.

Figure 5:
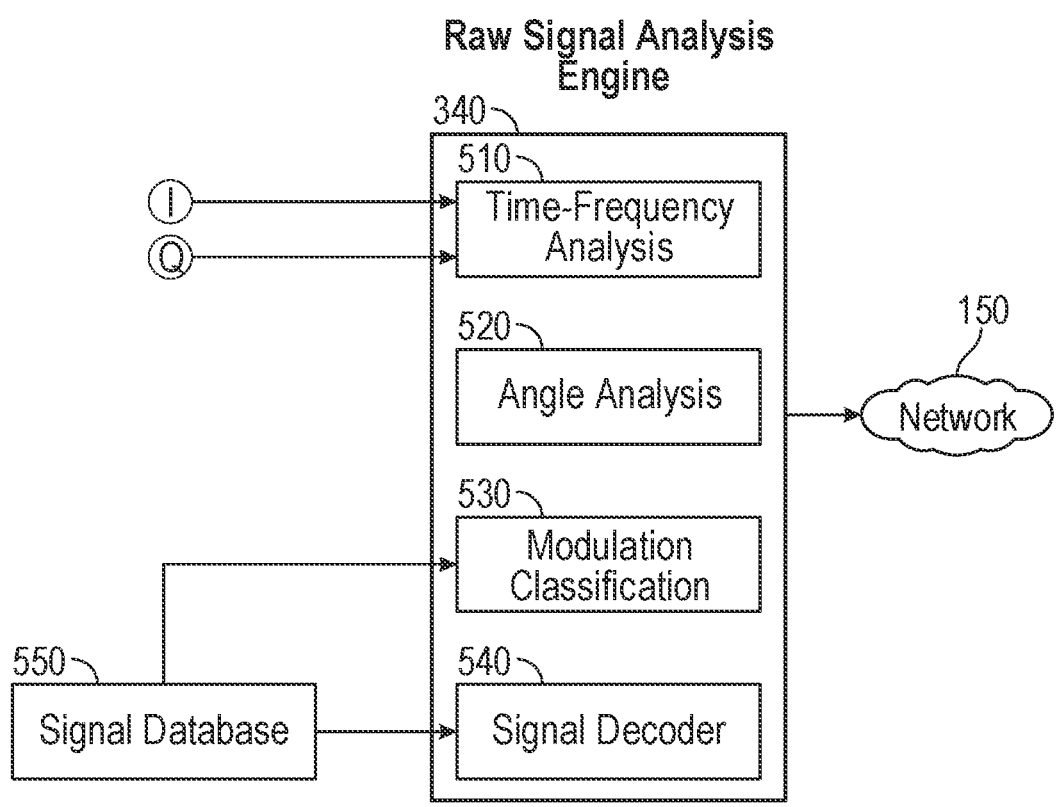
FIG. 5 illustrates block diagram depicting a raw signal analysis engine, in accordance with one or more embodiments of the disclosure.

FIG. 5 is a block diagram depicting a raw signal analysis engine 340 in accordance with one or more embodiments presented herein. The raw signal analysis engine 340 may receive digital I and Q signal samples for processing. Processing modules of the raw signal analysis engine 340 may include, among other examples, time-frequency analysis 510, angle analysis 520, modulation classification 530, and signal decoding 540. The processing modules, particularly the modulation classification module 530, and the signal decoding module 540, may leverage a signal database 550. Outputs from the raw signal analysis engine 340 may be communicated onto the network 150.

Once received by the raw signal analysis engine 340, the digital I and Q signal samples may be processed and refined to a discrete set of feature vectors. It should be understood that the feature vectors may be processed and re-processed by the various modules associated with the raw signal analysis engine 340 any number of times before being transmitted to the other modules of the signal analysis system 230.

The time-frequency analysis module 510 can generate a set of frequency-domain data vectors for each radio frequency signal 215. The spectrum intensity for each time-frequency bin associated with the frequency-domain data vectors may be encoded as dimensions of feature vectors for each of the radio frequency signals 215.

The time-frequency analysis module 510 can perform a moving window process where N time samples are selected to be processed. The value of N may be adjusted to optimize performance. A fast Fourier transform (FFT) may be computed for the N samples of the window. The FFT output may represent the spectral energy content of the window. The FFT of a vector of samples x may be defined by the matrix-vector product y=Qx, where the i k element of Q is exp−2*pi*i*k*j/N and j is the square root of the negative one. As new samples of the input signal arrive, the moving window may slide by K samples to a new set of N samples. The value of K may be optimized to maximize the system performance. According to one example, such optimization may be accomplished with a Monte Carlo approach where various values of N and K are tested on a reference signal set, and the values of N and K that maximize a system performance objective function may be selected for use. The system performance objective function may be an aggregation of various performance metrics. These metrics may include, among other examples, signal detection accuracy, modulation classification accuracy, malicious/benign classification accuracy, attack classification accuracy, or processing speed. The output of the FFT may be a sequence of P frequency-domain data vectors y p. The collection of these data vectors can be plotted to show the time-frequency energy in the RF environment. This plot is commonly referred to as a spectrogram.

The time-frequency analysis module 510 can perform energy clustering and association. The frequency-domain data vectors from the FFT may be evaluated for each radio frequency signal 215 received at each respective antenna 310. Each radio frequency signal 215 may contain multiple signals received at the associated antenna 310. Energy clustering and association can perform a clustering analysis on each set of frequency-domain data vectors to determine discrete contiguous blocks of signal that are likely to have been transmitted from the same device. Clustering algorithms such as k-nearest neighbors (KNN), hierarchical clustering, expectation-maximization, or any others may be used to perform the clustering. Spectrum feature extraction may be performed on each cluster. Spectrum feature extraction can analyze the clusters to extract a set of signal features including, but not limited to, duration, bandwidth, center frequency, duty cycle, and average power.

As an example of cluster analysis, each cluster can be considered a set of points in the multidimensional feature space. The objective of the cluster analysis can be to determine the representative characteristics of the signal that corresponds to each cluster. Accordingly, statistical measures such as the mean, median, or mode of each dimension may be calculated and then taken to represent the signal as that feature dimension. Each cluster can make up a discrete instance of a feature vector. Each feature vector includes one or more of the feature values that implicitly characterize the signals in the environment. Feature vectors created by the time-frequency analysis module 510 may be the inputs to the angle analysis module 520.

It should be appreciated that spectrum feature extraction performed by the time-frequency analysis module 510 may be a similar operation as the feature extraction performed by the space-time-frequency analysis module 550. However, the space-time-frequency analysis module 550 may be configured to cull the disparate refined feature vectors from multiple radio frequency signal 215 (from multiple antennas 310), where the multidimensional cluster of points in feature space may be statistically analyzed to extract a representative value in each feature vector. According to various embodiments, the space-time-frequency analysis module 550 performs an analysis similar to the time-frequency analysis module 510, but does so with multiple refined feature vectors.

The angle analysis module 520 can add an angle dimension to each feature vector. The result is a feature space that also includes an angle dimension since the feature vector is amended to include an angle estimate. The angle analysis module 520 can estimate an orientation (defined, for example, by one or more angles) of a position for a wireless device 210 acting as a radio source associated with the received signal. The angle analysis module 520 can sweep through a range of antenna phases. Various phase combinations of the antennas 310 may be used in order to discriminate the source of an emission by an angle relative to the antennas 310. For example, a complex-valued sample may be taken from the frequency-domain data vectors of each of L antennas 120. A vector z may be formed of these samples. A linear combination of the elements of z may be defined by multiplying by a point vector w (a) that is a function of the angle of interest, a. The resulting vector product w (a) z is a scalar value that indicates the intensity of the time-frequency energy in the angle direction a. According to particular embodiments, by sweeping through a range of values, the angle analysis module 520 can determine an energy over a space-time-frequency (STF) data cube. Angle interference suppression may be performed on the STF data cube to filter out irrelevant RF signals. The angle analysis module 520 can then perform angle clustering and association on the filtered data cube. Angle clustering and association can refine the feature vector based on the angle information. The resulting updated set of feature vectors may be referred to as angle feature vectors. Each angle feature vector can include characteristics about each signal, such as duration, bandwidth, center frequency, duty cycle, average power, and angle.

The modulation classification module 530 can compare the angle feature vectors to features of a library of known signals. The known signals may be retrieved from the signal database 550. The modulation classification module 530 can perform classifications of detected features by matching the received feature vector to a feature vector of a known signal. The matching may seek to minimize a distance metric within a multidimensional feature space. Various alternative distance metrics may be used, including, among multiple other examples, Euclidean distance, weighted-sum distance, min-max distance, and so forth. The choice of distance metric may be a parameter of the system; this can be optimized to maximize performance. Such matching may also be referred to as correlating data samples associated with the communicated signal to known modulation characteristics within the updatable signal signature database 550. Outputs from the modulation classification module 530 may be angle feature vectors that also include modulation types. These may be referred to as modulation feature vectors.

The signal module 540 can decode messaging layer content from modulation feature vectors. Generally, decoding payload data from the wireless devices 210 may be avoided to protect private or personal information. Instead, the signal decoder module 540 may decode unencrypted control information such as handshaking messages (for example, FIN, ACK, FIN ACK, and so forth). The signal decoder module 540 may decode handshaking messages to identify devices using common medium access signals like the MAC address of a device. Upon examining a received feature vector, the signal decoder module 540 may retrieve appropriate codecs and drivers from the signal database 550 for decoding the signal. The signal decoder module 540 can decode information features by identifying a corresponding physical layer template or signature from the updatable signal signature database 550. The signal decoder module 540 can decode communication symbols, for example, information modulated within a transmitted signal, from the data samples, or other information associated with the collected signals, from one or more feature vectors. The signal decoder module 540 can decode information features by identifying a corresponding medium access layer template or signature from the updatable signal signature database 550. Outputs from the signal decoder module 540 may include additional features (such as information features, also known as data or payload features) to be appended to the received modulation feature vectors. The additional features may include decoded content represented, for example, as a binary sequence or other symbols.

The signal database 550 may provide a library of known signals to the raw signal analysis engines 340. According to certain embodiments, a feature vector of a known signal may be matched against or correlated to a received feature vector to classify modulation types and other parameters associated with the received signal. The signal database 550 may also provide codecs and drivers to the raw signal analysis engines 340. The codecs and drivers may be used for decoding the content of the received signal once its modulation type has been classified. It should be appreciated that the signal database 550 may be provided as one of the analysis databases 580.

Outputs from the raw signal analysis engines 340 may comprise a set or stream of refined feature vectors. These feature vectors may have been refined from the received digital I and Q signal samples through one or more iterations of processing by the various modules associated with the raw signal analysis engine 340. The outputs from the raw signal analysis engine 340 may be communicated onto the network 150 to be further processed through the other modules of the signal analysis system 130. The network 150 may comprise one or both of the raw digital signal-switching network 520 and the signal feature vector network 530.

Figure 6:
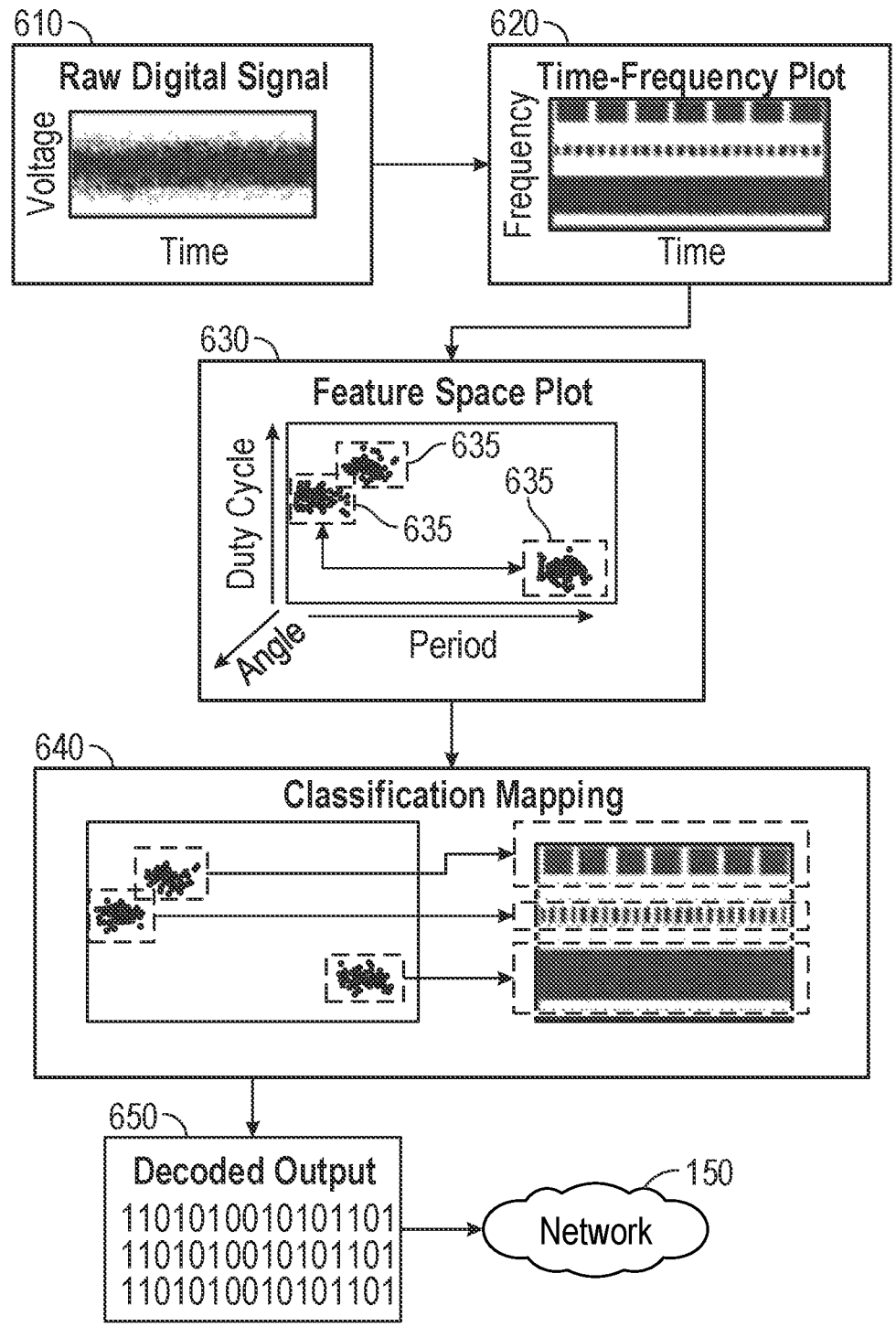
FIG. 6 illustrates a block diagram depicting signal visualization within a raw signal analysis engine, in accordance with one or more embodiments of the disclosure.

FIG. 6 is a block diagram depicting signal visualization within a raw signal analysis engine 340 in accordance with one or more embodiments presented herein. Signal processing flow within the raw signal analysis engine 340 may be visualized as time-frequency plots 620, feature space plots 630, and classification mappings 640. Visualization of feature space plots 630 can include vector clusters 635. A decoded output 650 associated with the raw signal processing may be communicated within feature vectors onto a network 150. The generated feature vectors may incorporate various characteristics of the original received RF signals as provided by the raw signal analysis engine 340.

Receivers, such as one or more software-defined radios 635, may provide in-phase and quadrature (I and Q) data to the raw signal analysis engine 340. The I and Q data may be provided as a sequence of complex-valued samples that arrive at the sample rate associated with the receiver. There may be a sequence of I and Q data for each antenna associated with the receiver. The I and Q data may be visualized using the raw digital signal plot 610. The raw digital signal plot 610 can visualize a signal amplitude (such as voltage, current, power, or so forth) as a function of time. The raw digital signal plot 610 can visualize the real and imaginary parts of the I and Q data.

The I and Q data of each antenna may be received by the time-frequency analysis module 610. The time-frequency analysis module 610 can generate time-frequency data from the I and Q data. A time-frequency plot 620 may be used to visualize the time-frequency data. The time-frequency plot can show signal intensity (such as energy or amplitude) as a function of frequency and time.

Feature vectors associated with the received signals may be generated through analysis of the time-frequency data. The feature vectors may be visualized within a feature space plot 630. The feature space plot 630 can show the feature vectors in an appropriate feature space. According to the illustrated example, the feature space of the feature space plot 630 is duty cycle against period.

Feature vector clusters 635 may be identified among the feature vectors analyzed within their appropriate feature space. Example feature vector clusters 635 are illustrated within the feature space plot 630. It should be appreciated that while the example illustrated feature space plot shows three feature vector clusters, any number of cluster may be present and identified with the received signals.

The angle analysis module 620 can analyze the time-frequency data to obtain angle data associated with the received signals. The estimated angle data may be updated into the feature vectors. This additional data may be visualized as an added angle dimension within the feature space plot 630.

The modulation classification module 630, can match angle feature vectors for each received signal to a known or abstracted modulation template within signal database 550. A classification mapping 640 may be used to visualize the mapping of feature vector clusters 635 to regions within the associated time-frequency plot 620 according to classification of modulation present within the received signals.

The signal-decoding module 440 can process the feature vectors associated with the received signals to obtain a decoded output 650. The decoded output 650 may comprise binary sequences associated with payload or control signaling present within the received signals. These sequences may be updated into the refined feature vectors to be passed over the network 150.

Figure 7:
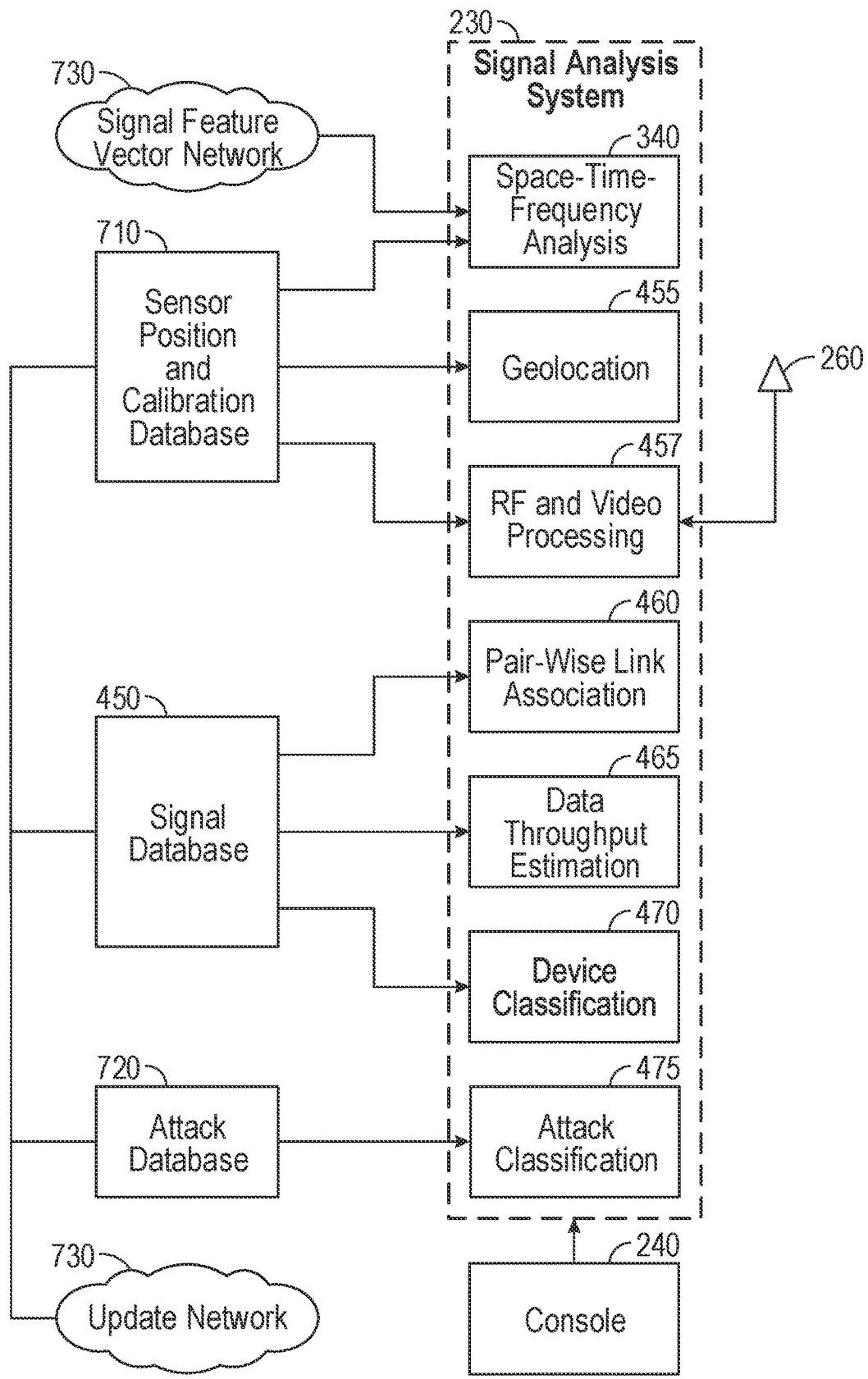
FIG. 7 illustrates a block diagram depicting electromagnetic signature analysis within a wireless internet of things, in accordance with one or more embodiments of the disclosure.

FIG. 7 is a block diagram depicting electromagnetic signature analysis within a wireless Internet of Things in accordance with one or more embodiments presented herein. Signal feature vectors generated by the receivers may be communicated through a signal feature vector network 730 to a signal analysis system 230. Various modules associated with the signal analysis system 230 may further process these receiver outputs. These modules may include, for example, space-time-frequency analysis 450, geolocation 455, RF and video processing 457, pair-wise link association 460, data throughput estimation 465, device classification 470, and attack classification 475. These modules may be supported by various analysis databases 480, such as a sensor position and calibration database 710, a signal database 450, and an attack database 720. One or more cameras 260 may be configured to provide video streams in support of RF and video processing 457. These analysis databases 480 may be updated over an updated network 730. A console 240 can provide a user interface for configuring, controlling, or reviewing analysis results associated with the signal analysis system 230.

The signal feature vector network 730 can switch and route signal feature vectors from the raw signal analysis engines 340 to the signal analysis system 230. The signal analysis system 230 may comprise a signal aggregation and analysis engine comprised of one or more feature vector processors. The signal feature vectors may be transported within the signal feature vector network 430 as packetized data or streaming data. It should be appreciated that the signal feature vector network 430, along with the antenna signal-switching network 410 and the raw digital signal-switching network 420, may be associated with or share resources with the network 150.

The signal analysis system 230 can aggregate and process the various radio frequency signals 215 captured from the electromagnetic environment by the sensors 120. Example modules of the signal analysis system 230 may include space-time-frequency analysis 450, geolocation 455, pairwise link association 460, data throughput estimation 465, device classification 470, and attack classification 475. It should be appreciated that the various modules of the signal analysis system 230 may receive sampled signals and/or signal feature vectors from one or more receivers such as the software-defined radios 435 and/or the hardware-defined radios 440.

The space-time-frequency analysis module 450 can process refined feature vectors from multiple sensors 120 and match them up to a common reference frame. The space-time-frequency analysis module 450 can also resolve redundant signal detection when the same signal is detected at more than one sensor 120.

The space-time-frequency analysis module 450 can perform signal clustering and association. Feature vectors from multiple sensors 120 may be clustered into common groups. Clustering may be supporting using a k-nearest neighbors (KNN) algorithm, a hierarchical clustering algorithm, an expectation-maximization algorithm, or any other clustering algorithm. A specific clustering algorithm may be chosen to maximize system performance. For example, a Monte Carlo approach may be used to evaluate multiple clustering algorithms against a reference signal set to select the clustering algorithm that maximizes a particular system performance objective. The system performance objective function may be an aggregation of performance metrics, including signal detection accuracy, modulation classification accuracy, attack classification accuracy, and processing speed.

The space-time-frequency analysis module 450 can perform feature extraction. Feature extraction can cull disparate refined feature vectors from multiple sensors 120 into an aggregate feature vector that represents all of (or a significant portion of) the information about wireless devices 210 in the environment with minimal, or significantly reduced, redundancy. Certain dimensions of aggregated feature vectors may provide identical values across multiple sensors 120. These may include duration, bandwidth, center frequency, and duty cycle, among others. Certain other dimensions of aggregated feature vectors may be maintained as a list of potentially disparate values, with each value corresponding to a single sensor 120. For instance, the dimensions of the aggregate feature vectors representing a power and an angle of a signal may vary across sensors 120.

The geolocation module 455 can estimate positions of interest. Determining the position, or relative positions, of wireless devices 210, other entities, or associated signals may be referred to as geolocating, localization, positioning, geographical locating, and other similar terms. Localization over time can support modeling or estimation of motion, including direction, velocities, accelerations, and other parameters. The geolocation module 455 can receive the aggregate feature vector set. Geolocating signals in an environment that is dense with other signals and contains complex propagation effects like multipath and Doppler shift can present several challenges. To aid in estimating the position of each signal, propagation modeling may leverage a database of sensor positions and various parameters associated with the propagation environment. The database may be populated through various possible calibration techniques. According to a particular example, the calibration may involve transmitting from wireless devices 210 with known positions. Each sensor 120 can record the received power of each of the reference emissions from the wireless devices 210 with known positions. From all of the known values, a parametric fit for the unknown propagation values may be performed. According to one example of this approach, the collected receiver power from the reference emitter received by the sensor 120 may be represented as: $P_{i,r} = a/d_{i,r}^n$ where a and n are the unknown calibration parameters to be estimated and $d_{i,r}$ is the known distance between the i th reference emitter wireless device 210 and the r th sensor 120. When the number of sensors 120 is given as R and the number of reference emitter wireless devices 210 is given as I, then the calibration process results in R×I equations in two unknowns. Various optimization methods may be used to solve for the unknowns, including, but not limited to, least-squares estimation, minimum-mean-square estimation, constrained optimization, and so forth.

Propagation modeling functionality of the geolocation module 455 may leverage the calibration parameters, signal power, and angle values, and a coordinate system of locations for the sensors 120 to calculate a forward model of the expected power and angle values for sample points in space. According to particular embodiments, the model values may be used to create an initial geolocation estimate using multilateration techniques. The initial geolocation estimate may be used to seed a model-matching filter. The model-matching filter can evaluate multiple aggregated feature vectors in series. For each aggregate feature vector, the model-matching filter may initialize an ensemble of hypothesized signal source positions around the initial seed position. In an iterative process using the model values, a tighter estimate of the aggregate feature vector position may be generated for the wireless device 210 being located. As part of each iteration, hypothesized positions that do not fit the model may be removed. After a sufficient number of iterations, the position estimate for the aggregate feature vector may converge to a single point. This approach may be repeated for all aggregate feature vectors.

Model localization may use a similar technique of hypothesized positions; however, the hypothesis set may also include a range of time steps. Multiple iterations of hypothesized trajectories (or tracks) may be examined where prior information about the likelihood of each trajectory may be considered in the model. By filtering out unlikely tracks, a track may be converged that best fits the data. For example, it is likely that a mobile device will be traveling at 2 m/s, but it is unlikely that it will be traveling at 200 m/s. Accordingly, a track indicating an aggregate feature vector from a mobile device traveling at 200 m/s may be filtered out of the model. Resultant geolocation track data for localization may be incorporated into the aggregate feature vector to create a feature vector that includes location data.

The RF and video processing module 457 can coprocess one or more video streams from the cameras 260 with various RF persona information to identify and track objects and/or people within the video stream in a deterministic fashion.

The pair-wise link association module 460 may determine a link pair of wireless devices 210. Generally, a signal emanates from a source wireless device 210 and is intended for one or more destination wireless devices 210. The emitting device and a receiving device may constitute a link pair. Information about link pairings may be useful in inferring the behavior and intent of wireless devices 210 within a network.

Modulation association may be implemented within the pair-wise link association module 460. Generally, wireless devices 210 within a wireless network participate in pair-wise links between devices. The pair-wise link association module 460 can infer these pair-wise links from observed wireless features such as modulation, position, space-time-frequency occupancy, and so forth. Modulation association can analyze modulation feature information to calculate a likelihood that any pair of wireless devices 210 are communicating with one another.

Pair-wise links may also be determined by examining decoded message contents. For example, Wi-Fi header fields explicitly indicate a destination MAC address. When it is not clear from the decoded signal, which pairs of wireless devices 210, is communicating, then space-time-frequency association may be used to perform a more nuanced evaluation for likely communication pairs. Signal pairing mechanisms such as time division duplexing (TDD), frequency division duplexing (FDD), or space division duplexing (SDD) may indicate communicating pairs of wireless devices 210. Space-time-frequency feature information for each geolocation feature vector may be used to determine which signals could feasibly be communicating with one or more known duplexing schemes. For example, if a first geolocation feature vector and a second geolocation feature vector both occupy the same frequency, but never at an overlapping time, it may be inferred that the wireless devices 210 associated with those vectors may be a communicating pair using TDD. Feature vectors successfully evaluated by the pair-wise link association module may be appended with a new set of feature vectors that contain the pairwise link information. These may be referred to as pairwise feature vectors.

The data throughput estimation module 465 can estimate an amount of data in each pairwise feature vector. Even when signal content data is not directly decoded, its spectral occupancy may serve as a proxy for the amount of data that is being passed through each link wireless devices 210 associated with each pairwise feature vector. This estimation may occur on two levels. The first level, spectrogram analysis, can use Shannon's capacity formula $C=B \log 1+SNR$ to bound the maximum amount of data transfer, where B is the occupied bandwidth, and SNR is the signal-to-noise ratio. These two parameters may be estimated using the features estimated by the signal analysis system 230. Specifically, B can be directly calculated from spectrogram analysis, and SNR can be calculated from the average power and geolocation data. The second level, modulation, and link analysis, can leverage a signal signature database containing data throughput values for various known signal modulation schemes. By pairing the modulation feature values included in the pair-wise feature vector with the signal signature database entries, modulation, and link analysis can provide a reasonably accurate estimate of the data throughput for each pair-wise feature vector. An estimate of the data throughput for each signal may be added to each corresponding pair-wise feature vector. The amended pair-wise feature vector may now be referred to as a data throughput feature vector.

The device classification module 470 can classify wireless devices 210 as being either benign or malicious (also referred to as unauthorized or rogue). Devices classification can function to identify each pairwise feature vector as either benign or malicious. The device classification module 470 can perform signature matching, which attempts to match the signal and link features of each data throughput feature vector to known examples of benign and malicious devices in the signal signature database. The device classification module 470 can further perform anomaly analysis, which compares the features associated with each data throughput feature vector into an aggregate metric. If the aggregate metric exceeds one or more established anomaly thresholds, the associated wireless device 210 may be flagged as malicious or potentially malicious. The device classification module 470 can also perform location analysis or geo-fencing, which evaluates the geolocation features associated with each feature vector. If an unauthorized wireless device 210 is identified to be within a restricted area, then the wireless device 210 may be flagged as malicious or potentially malicious.

The device classification module 470 can identify attacking (malicious) wireless devices by comparing content of the received feature vectors against signatures of known attack signal. This comparison can comprise performing a blind determination of multiplexing techniques within the radio frequency signals. Determining multiplexing techniques can include identifying duplexing such as TDD, FDD, SDD, or other such duplexing. Multiplexing may also include multiple access where two or more transmitters are sharing a given resource, such as in time-division multiplexing, code division multiplexing, frequency division multiplexing, frequency hopping, and various other such approaches.

The attack classification module 475 can determine the type of attack being perpetrated by a malicious wireless device 210. The attack classification module 475 can also determine if multiple malicious wireless devices 210 are involved in the attack and which victim wireless devices 210 are being attacked. The attack classification module 475 can support attack matching, which can use a library of attack templates to match malicious wireless device 210 activities to known attacks such as spoofing, DoS, jamming, wormholes, system penetration analysis, and others discussed herein or known in the art. The attack classification module 475 can support determination of attacking radios where the pair-wise link features of a malicious wireless device 210 may be used to identify a network of multiple attacking wireless devices 210. Such a network of multiple attacking wireless devices 210 may also be identified without using pair-wise link information depending upon the type of attack. For example, a pair of wireless devices 210 that have been classified as malicious may be clearly jamming on one frequency, but may also be communicating TDD on a second frequency. The attack classification module 475 can support determination of attacking radios to identify these two malicious wireless devices 210 as part of a malicious network executing a distributed jamming attack. The attack classification module 475 can support determination of victim radios for creating a list of wireless devices 210 being attacked by a network of attacking wireless devices 210. According to the distributed jamming attack example, the victim wireless devices 210 may be any network of benign wireless devices 210 using the frequency that is being jammed by the malicious wireless devices 210 of the attack network.

The attack classification module 475 can support attack intent inference to determine a high-level intent for a network of wireless devices 210. Attack intent inference can use an attack database and information regarding the locations and sizes of the networks. Regarding the distributed jamming attack example, if the victim wireless devices 210 being jammed are part of a closed-circuit video surveillance system, attack intent inference may indicate that the intent of the attack is to disable video. If, on the other hand, the victim's wireless devices 210 are cellular telephones located in a boardroom, attack intent inference may indicate that the intent of the attack is to block mobile carrier communications in and out of the boardroom.

The analysis databases 480 may include, among various other examples, signal databases 450, sensor position and calibration databases 710, and attack databases 720. One or more of the signal processing and threat analysis stages of the signal analysis system 230, including the raw signal analysis engines 340, may leverage the analysis databases 480. The analysis databases 480 may contain various forms of information useful in analyzing the radio frequency signals collected by the sensors 120.

It should be appreciated that while the analysis databases 480 are generically referred to as databases, the information may be stored within tables, relational databases, other types of databases, flat files, memories, lists, data blobs, data structures, or any other data storage or organization technology. The analysis databases 480 may be stored locally at the signal processing and threat analysis modules of the signal analysis system 230 and the raw signal analysis engines 340, within one or more systems attached via the networks 150, online, in a storage cloud, in any other location, or any combination thereof. It should be appreciated that the analysis databases 480 may be distributed at the level of the sensors 120, distributed at the level of the signal processing and threat analysis modules of the signal analysis system 230, centralized at the building level, centralized at the campus level, centralized at the enterprise level, or centralized at the level of one or more providers. Various other granularities or localities of storage for the analysis databases 480 may also be supported without departing from the spirit or scope of the technology presented herein.

One or more signal databases 450 may be included among the analysis databases 480. The raw signal analysis engines 340 may leverage information within the signal databases 450 for matching or correlating features of known signals against received signals. The raw signal analysis engines 340 may further leverage information within the signal databases 450 to retrieve codecs and drivers for decoding variously modulated signals. The pair-wise link association module 460, the data throughput estimation module 465, and the device classification module 470 may provide(?) each leverage information within the signal databases 450. The signal databases 450 may contain various signal signatures for known or abstract signal types. The signal databases 450 may provide mappings from signal features to signal types. Accordingly, the signal databases 450 may function as a look-up table for various signal analysis and aggregation operations.

One or more sensor position and calibration databases 710 may be included amongst the analysis databases 480. The space-time-frequency analysis module 450 and the geolocation module 455 may leverage the sensor position and calibration databases 710. The sensor position and calibration databases 710 may include the physical positions of various sensors 120 within the environment. The sensor position and calibration databases 710 may also include various parameters associated with electromagnetic wave propagation within the wireless communication environment.

One or more attack databases 720 may be included amongst the analysis databases 480. The attack classification module 475 may leverage information from the attack databases 720. The attack databases 720 may contain information or signal features that are indicative of specific attack types. The attack databases 720 may be used in conjunction with signals collected from the sensors 120 to identify types of attacks being perpetrated by malicious wireless devices 210.

It should be appreciated that portions of the information within the analysis databases 480 (including the signal databases 450, the sensor position and calibration databases 710, and the attack databases 720) may be preinstalled at purchase, installation, or configuration of the sensors 120, the signal analysis system 230, and/or other systems supporting the technology presented herein. Portions of the information within the analysis databases 480 may be configured in the field. Such configuration may be performed manually, or autonomously through automated learning, tuning, or adaptation procedures. Portions of the information within the analysis databases 480 may be updated from time to time from a central provider, from backups, or from other installations. Such updates may occur over an update network 730. One or more central providers may receive related information that was learned or adapted in fielded installations. The received information may be incorporated into periodic updates provided by the central provider to the various fielded installations using the update network 730. It should be appreciated that the update network 730 may be associated with the network 150, the Internet, and/or any other networks associated with the technology presented herein.

Figure 8:
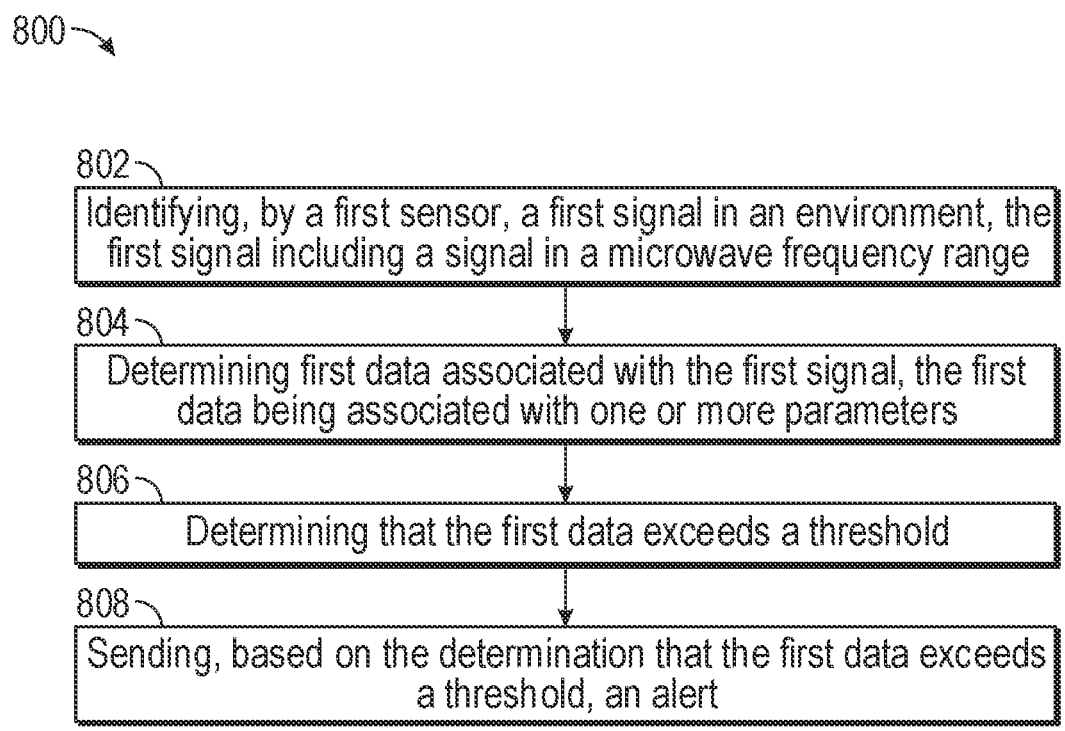
FIG. 8 illustrates an example method, in accordance with one or more embodiments of this disclosure.

FIG. 8 illustrates an example method, in accordance with one or more embodiments of this disclosure. At block 802 of the method 800 in FIG. 8, the method 800 may include identifying, by a first sensor, a first signal in an environment, the first signal including a signal in a microwave frequency range. Block 804 of the method 800 may include determining first data associated with the first signal, the first data being associated with one or more parameters. Block 806 of the method 800 may include determining that the first data exceeds a threshold. Block 808 of the method 800 may include sending, based on the determination that the first data exceeds a threshold, an alert.

In some embodiments, identifying the first signal is further based on the signal satisfying at least one of: a minimum pulse width, a maximum pulse width, an amplitude threshold, a search frequency list, and/or a dwell time per tune frequency.

In some embodiments, the one or more parameters include at least one of: a frequency of the first signal, a timestamp, an amplitude of the first signal, and/or a pulse width of the first signal.

In some embodiments, the method 800 may further include generating a first message, including the first data.

In some embodiments, the method 800 may further include identifying, by the first sensor, a second signal in an environment, the second signal including a signal in the microwave frequency range. The method 800 may further include determining second data associated with the second signal, the second data being associated with the one or more parameters. The method 800 may further include generating second message, including the second data. The method 800 may further include generating an aggregated message, including the first message and the second message.

In some embodiments, identifying the first signal is performed in a first mode. In some embodiments, the method 800 may include identifying, by the first sensor and in a second mode, a third signal, the third signal being a different type of signal than the first signal.

In some embodiments, the method 800 may further include determining, based on the first data, a first location of a source of the first signal.

In some embodiments, the method 800 may further include causing to present a user interface, the user interface including an indication of the first location of the source of the first signal at a first time, and an indication of a second location of the source of the first signal at a second time.

FIG. 9 depicts a block diagram of an example machine 900 upon which any of one or more techniques (e.g., methods) may be performed, in accordance with one or more example embodiments of the present disclosure. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904, and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a work assessment device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The power converter control system 919 may carry out or perform any of the operations and processes (e.g., operations described with respect to FIG. 8 or otherwise) described and shown above, and may facilitate the analysis and display of workplace disruption metrics, the display of workplace disruption scores and related data, the projected changes to workplace disruption scores, protocols governing workplaces, and the like.

It is understood that the above are only a subset of what the power converter control 919 may be configured to perform and that other functions included throughout this disclosure may also be performed by the power converter control 919.

While the machine-readable medium 922 is illustrated as a single medium, the term "machine-readable medium" may include a single medium, or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media, optical storage media, a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth-generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any method or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A method comprising:
    identifying, by one or more sensors, a first signal and a second signal in an environment, the first signal and the second signal including a signal in a microwave frequency range;
    determining first data associated with the first signal and second data associated with the second signal, the first data and the second data being associated with one or more parameters;
    generating a first message including the first data and a second message including the second data;
    generating an aggregated message including the first message and the second message;
    determining that the first data exceeds a threshold; and
    sending, based on the determination that the first data exceeds a threshold, an alert.

2. The method of claim 1, wherein identifying the first signal is further based on the first signal satisfying at least one of: a minimum pulse width, a maximum pulse width, an amplitude threshold, a search frequency list, or a dwell time per tune frequency.

3. The method of claim 1, wherein the one or more parameters include at least one of: a frequency of the first signal, a timestamp, an amplitude of the first signal, and/or a pulse width of the first signal.

4. The method of claim 1, further comprising generating a first message including the first data.

5. The method of claim 1, further comprising determining, based on the first data, a first location of a source of the first signal.

6. The method of claim 5, further comprising:
    causing to present a user interface, the user interface including an indication of the first location of the source of the first signal at a first time, and an indication of a second location of the source of the first signal at a second time.

7. The method of claim 1, wherein identifying the first signal is performed in a first mode, and wherein the method further comprises:
    identifying, by the one or more sensors and in a second mode, a third signal, the third signal being a different type of signal than the first signal.

8. A system comprising:
    a processor; and
    a memory storing computer-executable instructions, that when executed by the processor, cause the processor to:
        identify, by one or more sensors, a first signal and a second signal in an environment, the first signal including a signal in a microwave frequency range;
        determine first data associated with the first signal and second data associated with the second signal, the first data and the second data being associated with one or more parameters;
        generate a first message including the first data and a second message including the second data;
        generate an aggregated message including the first message and the second message;
        determine that the first data exceeds a threshold; and
        send, based on the determination that the first data exceeds a threshold, an alert.

9. The system of claim 8 wherein identifying the first signal is further based on the first signal satisfying at least one of: a minimum pulse width, a maximum pulse width, an amplitude threshold, a search frequency list, or a dwell time per tune frequency.

10. The system of claim 8, wherein the one or more parameters include at least one of: a frequency of the first signal, a timestamp, an amplitude of the first signal, or a pulse width of the first signal.

11. The system of claim 8, wherein the computer-executable instructions further cause the processor to generate a first message, including the first data.

12. The system of claim 8, wherein identifying the first signal is performed in a first mode, and wherein the computer-executable instructions further cause the processor to:
    identify, by the one or more sensors and in a second mode, a third signal, the third signal being a different type of signal than the first signal.

13. The system of claim 8, wherein the computer-executable instructions further cause the processor to:
    cause to present a user interface, the user interface including an indication of a first location of a source of the first signal at a first time, and an indication of a second location of the source of the first signal at a second time.

14. A non-transitory computer-readable medium storing computer-executable instructions, that when executed by a processor, cause the processor to:
    identify, by a first sensor, a first signal and a second signal in an environment, the first signal and the second signal including a signal in a microwave frequency range;
    determine first data associated with the first signal and second data associated with the second signal, the first data and the second data being associated with one or more parameters;
    generate a first message including the first data and a second message including the second data; and
    generate an aggregated message including the first message and the second message;
    determine that the first data exceeds a threshold; and
    send, based on the determination that the first data exceeds a threshold, an alert.

15. The non-transitory computer-readable medium of claim 14, wherein identifying the first signal is further based on the first signal satisfying at least one of: a minimum pulse width, a maximum pulse width, an amplitude threshold, a search frequency list, or a dwell time per tune frequency.

16. The non-transitory computer-readable medium of claim 14, wherein the one or more parameters include at least one of: a frequency of the first signal, a timestamp, an amplitude of the first signal, or a pulse width of the first signal.

17. The non-transitory computer-readable medium of claim 14, wherein the computer-executable instructions further cause the processor to generate a first message, including the first data.

* * * * *